(12) United States Patent
Morimoto

(10) Patent No.: US 8,415,409 B2
(45) Date of Patent: Apr. 9, 2013

(54) RADIATION-CURABLE INK COMPOSITION FOR INKJET RECORDING, INKJET RECORDING METHOD, AND PRINTED MATTER

(75) Inventor: Kiyoshi Morimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 322 days.

(21) Appl. No.: 12/698,568

(22) Filed: Feb. 2, 2010

(65) Prior Publication Data

US 2010/0221506 A1 Sep. 2, 2010

(30) Foreign Application Priority Data

Feb. 27, 2009 (JP) ................. 2009-046569

(51) Int. Cl.
| | |
|---|---|
| *B32B 9/04* | (2006.01) |
| *B32B 27/00* | (2006.01) |
| *B41J 2/01* | (2006.01) |
| *B41J 2/17* | (2006.01) |
| *B41M 5/00* | (2006.01) |
| *C07D 209/76* | (2006.01) |
| *C08B 37/00* | (2006.01) |
| *C08J 3/00* | (2006.01) |
| *C08K 5/00* | (2006.01) |
| *C08K 5/34* | (2006.01) |
| *C08K 5/48* | (2006.01) |
| *C08K 5/3435* | (2006.01) |
| *C09B 67/00* | (2006.01) |
| *C09D 5/00* | (2006.01) |
| *C09D 11/00* | (2006.01) |
| *G01D 11/00* | (2006.01) |

(52) U.S. Cl.
USPC .................. 523/160; 347/1; 347/95; 347/96; 347/100; 347/102; 428/32.1; 428/411.1; 428/500; 522/7; 523/161; 524/89; 524/90; 524/91; 524/102; 524/105

(58) Field of Classification Search .................. 523/160, 523/161; 522/7; 524/89, 90, 91, 102, 105; 347/1, 95, 96, 100, 102; 428/32.1, 411.1, 428/500
See application file for complete search history.

(56) References Cited

FOREIGN PATENT DOCUMENTS

| | | |
|---|---|---|
| EP | 2 042 570 A1 | 4/2009 |
| JP | 2004-2528 A | 1/2004 |
| WO | WO 2009/005137 A2 | 1/2009 |

OTHER PUBLICATIONS

Extended European Search Report dated Jun. 4, 2010 issued in corresponding European patent application No. 10000805.1-2102.

*Primary Examiner* — Patrick Niland

(74) *Attorney, Agent, or Firm* — Birch, Stewart, Kolasch & Birch, LLP

(57) ABSTRACT

The invention provides a radiation-curable ink composition for inkjet recording, the ink composition containing at least: a specific azo compound, a tautomer of the azo compound, a salt of the azo compound, a salt of the tautomer, a hydrate of the azo compound, a hydrate of the tautomer, or any combination thereof; a polymer dispersant; a radical polymerizable compound; and a radical polymerization initiator. The invention further provides an inkjet recording method including ejecting and curing the ink composition. The invention further provides a printed matter formed by the inkjet recording method.

9 Claims, No Drawings

Figure 3:
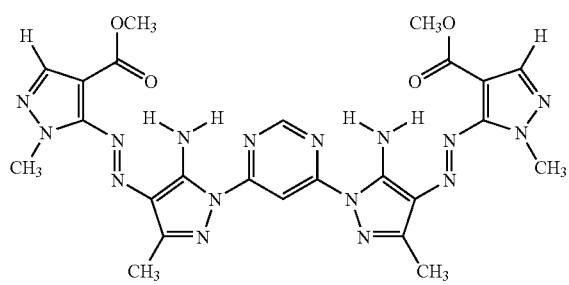
Figure 4:
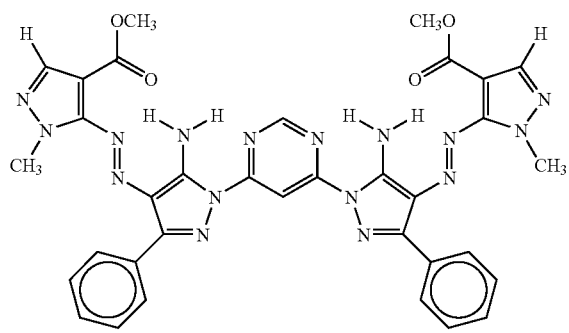
Figure 5:
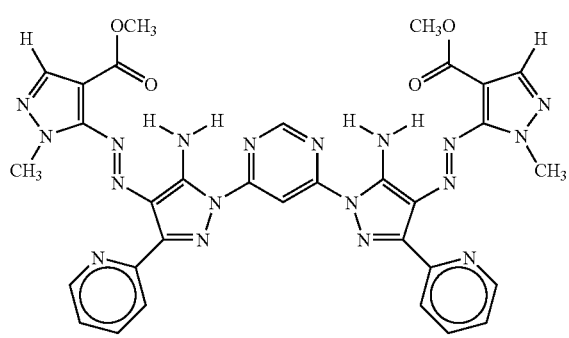
Figure 6:
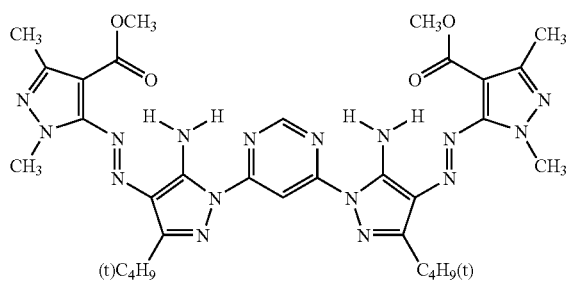
Figure 7:
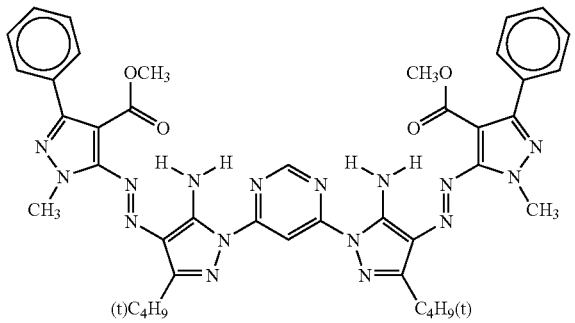
Figure 8:
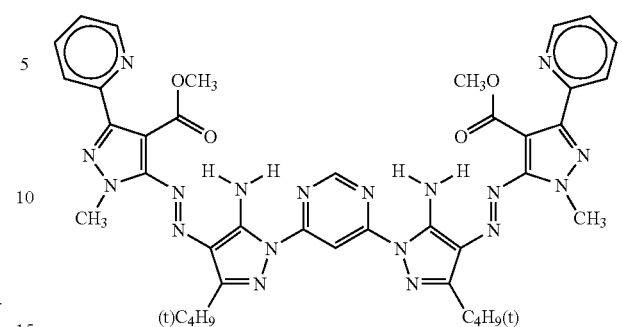
Figure 9:
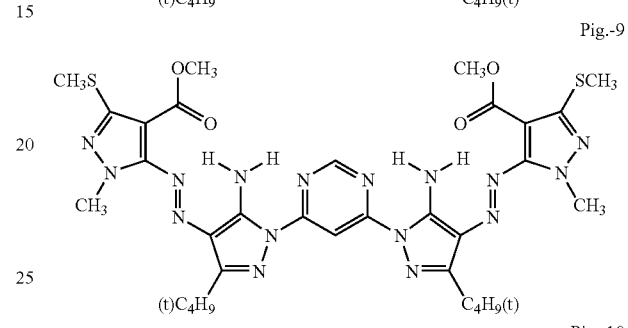
Figure 10:
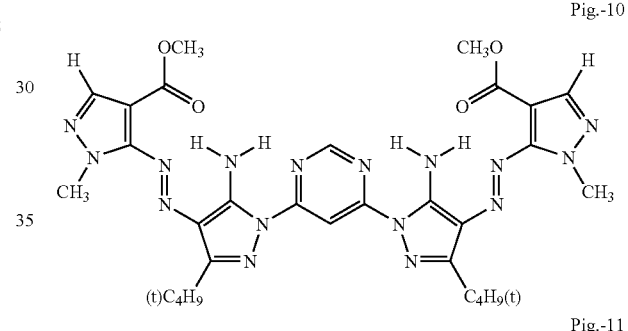
Figure 11:
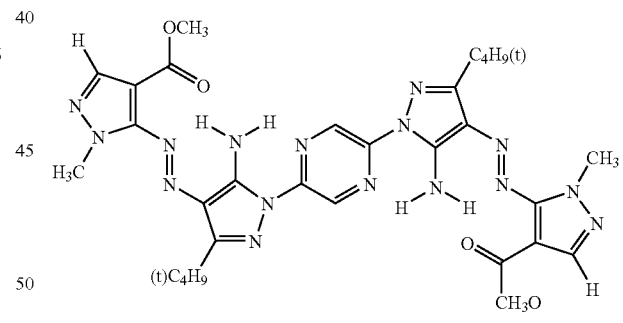
Figure 12:
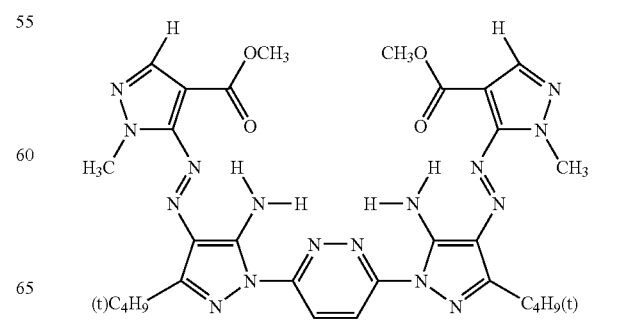
Figure 13:
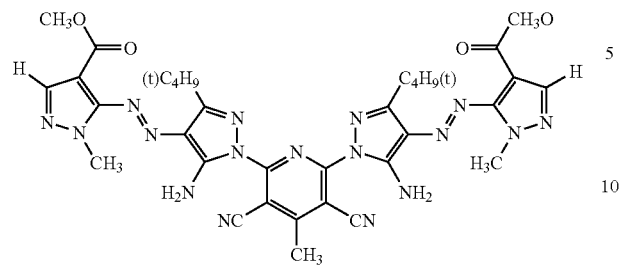
Figure 14:
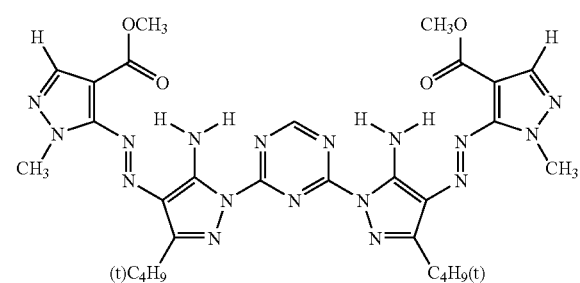
Figure 15:
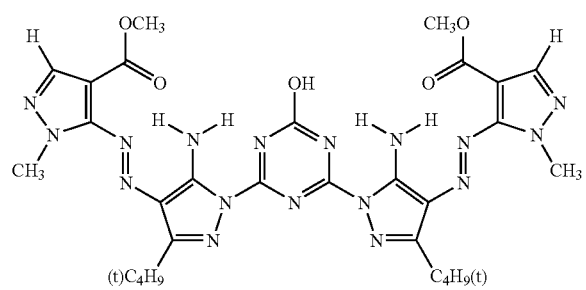
Figure 16:
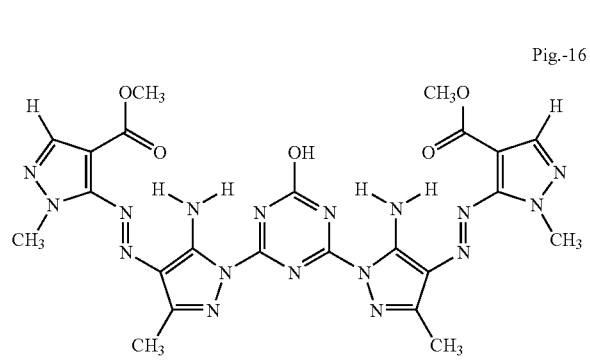
Figure 17:
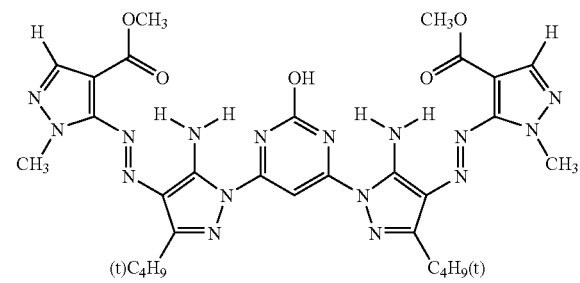
Figure 18:
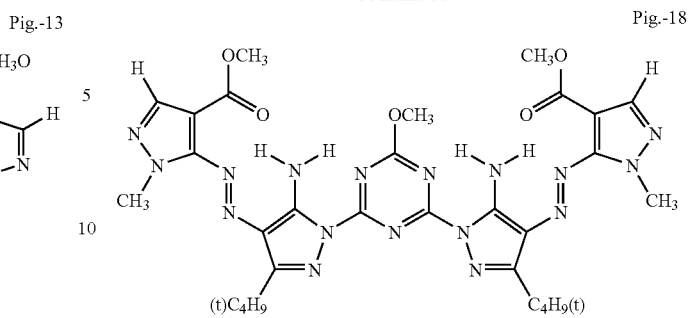
Figure 19:
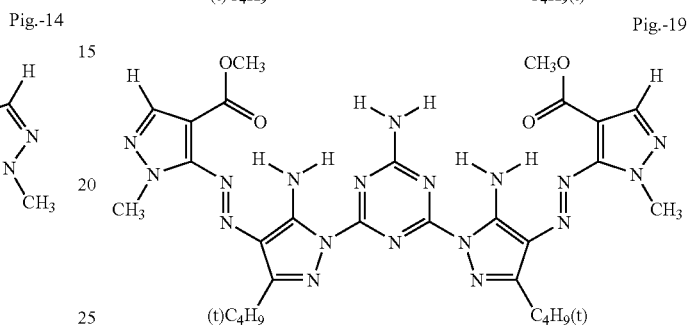
Figure 20:
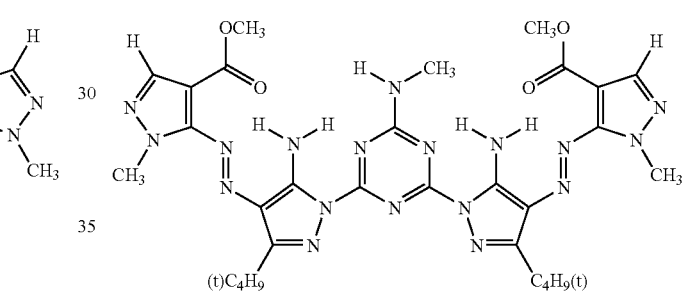
Figure 21:
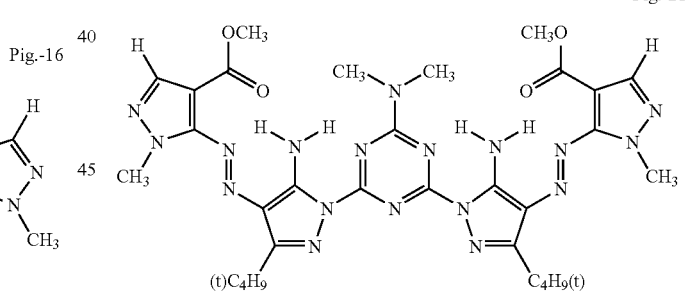
Figure 22:
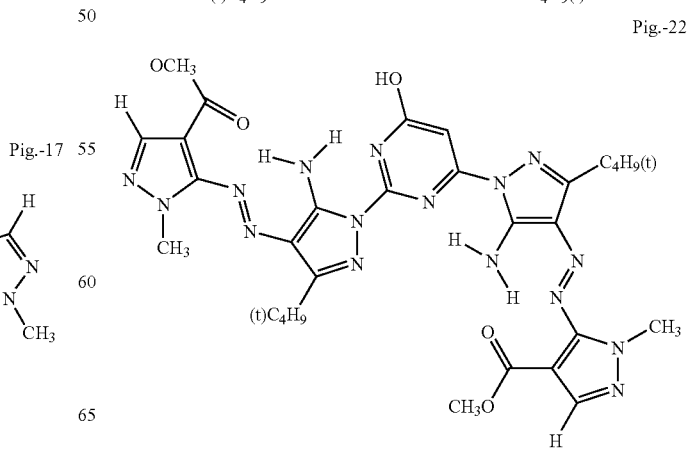
Figure 23:
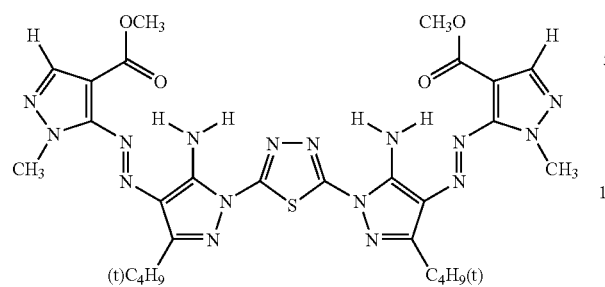
Figure 24:
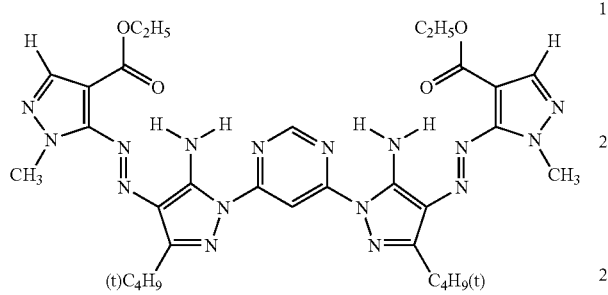
Figure 25:
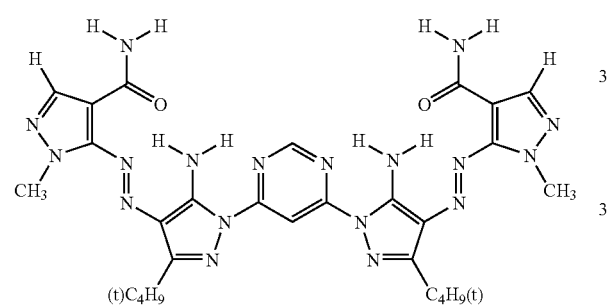
Figure 26:
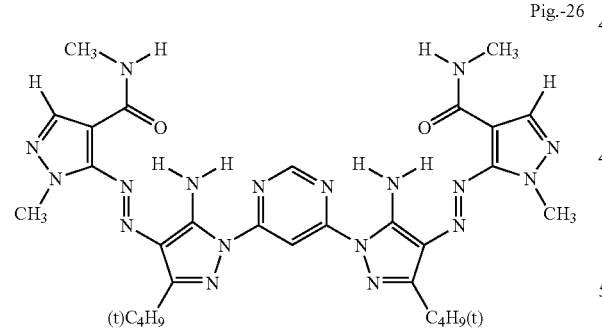
Figure 27:
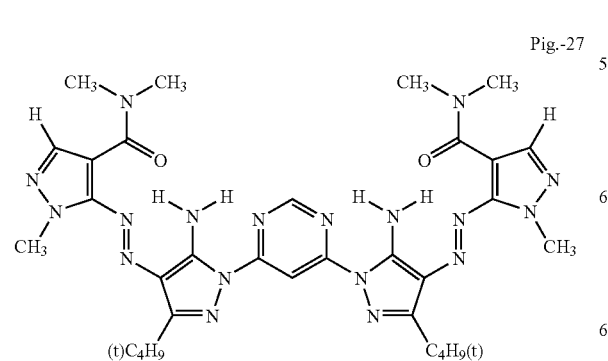
Figure 28:
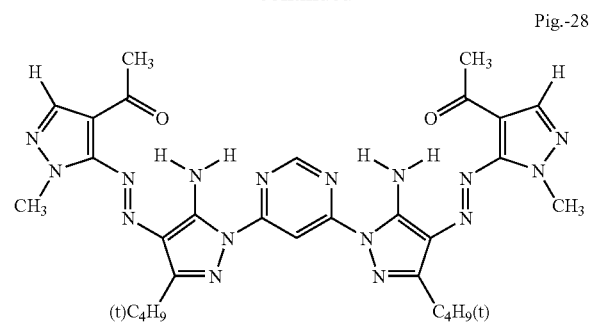
Figure 29:
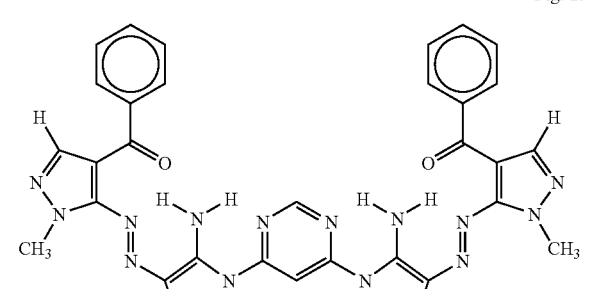
Figure 30:
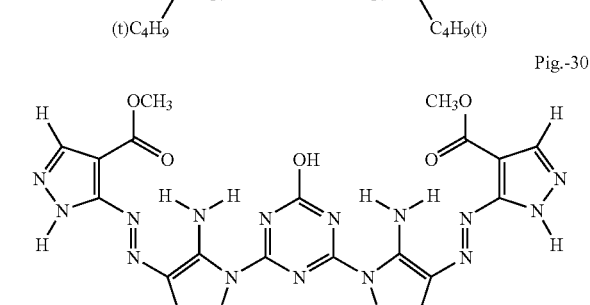
Figure 31:
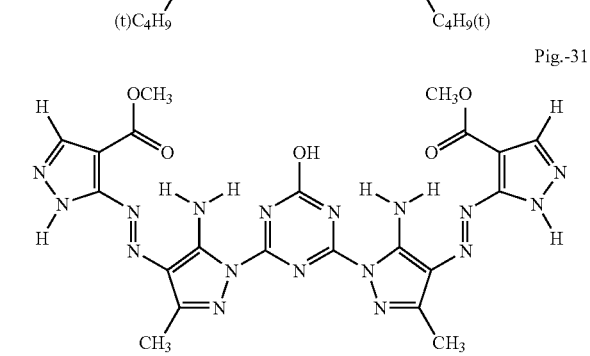
Figure 32:
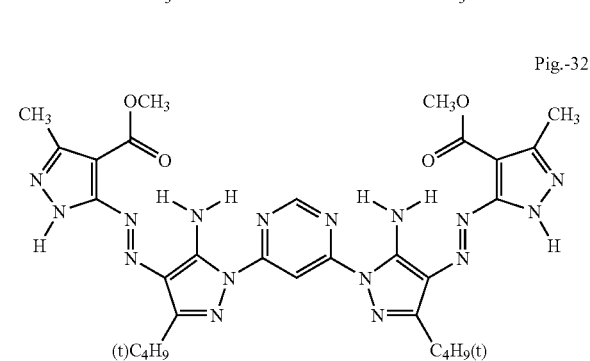
Figure 33:
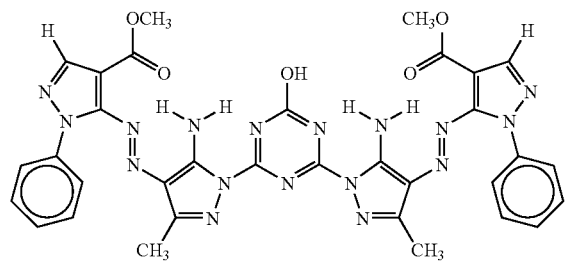
Figure 34:
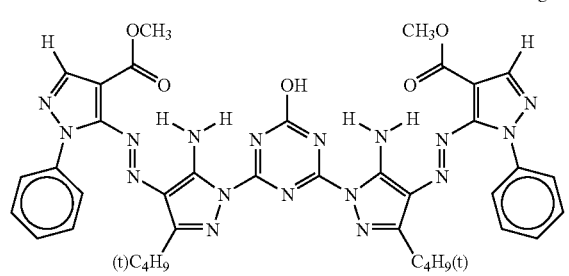
Figure 35:
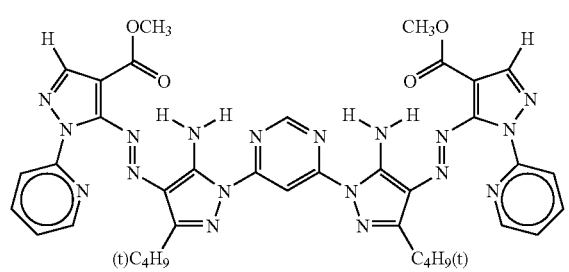
Figure 36:
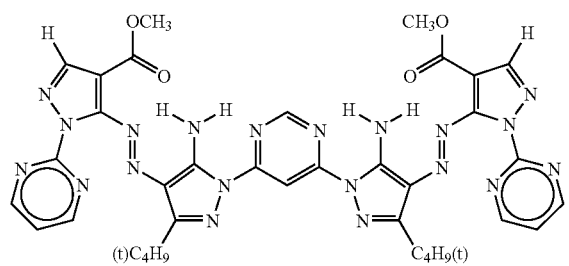
Figure 37:
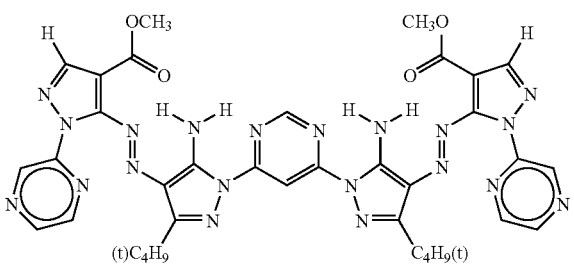
Figure 38:
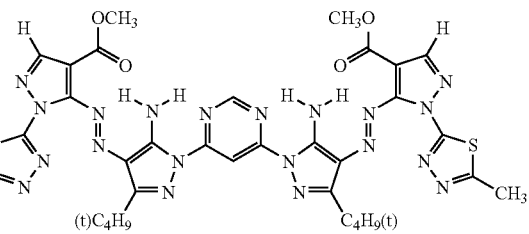
Figure 39:
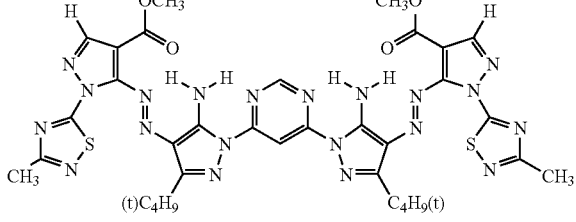
Figure 40:
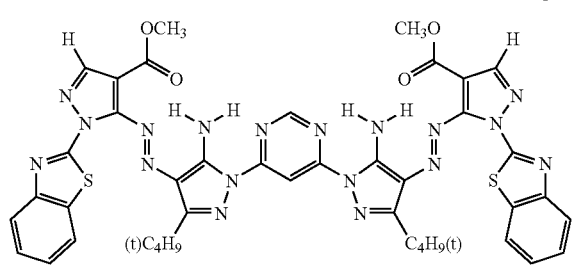
Figure 41:
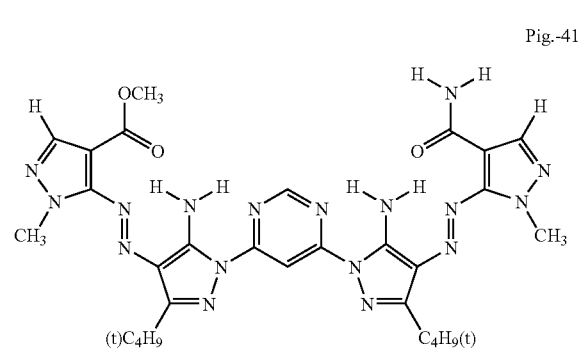
Figure 42:
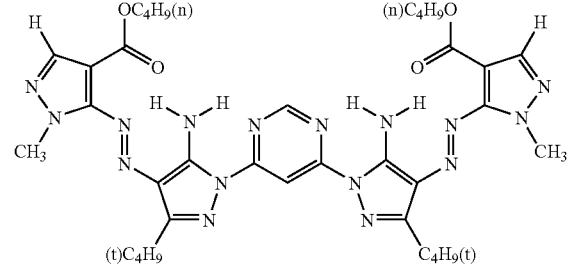

RADIATION-CURABLE INK COMPOSITION FOR INKJET RECORDING, INKJET RECORDING METHOD, AND PRINTED MATTER

CROSS-REFERENCE TO RELATED APPLICATION

This application claims priority under 35 USC 119 from Japanese Patent Application No. 2009-046569 filed on Feb. 27, 2009, the disclosure of which is incorporated by reference herein.

BACKGROUND OF THE INVENTION

1. Field of the Invention

The present invention relates to a radiation-curable ink composition for inkjet recording, an inkjet recording method using the ink composition, and a printed matter obtained by using the ink composition.

2. Related Art

Inkjet recording enables to form an image with simple and inexpensive manner. Inkjet recording has excellent applicability to printing on a recording medium with an irregular surface shape since it performs ejection of an ink from a nozzle which does not contact with a recording medium.

Limited kinds of recording media and costs accompanied therewith have been concerned with respect to inkjet recording, that requires exclusive paper as the recording media. There have been many attempts to print on a transferred medium which is different from the exclusive paper by the inkjet recording.

Attention has been recently focused on a solventless inkjet recording method which includes forming an image using a radiation-curable inkjet recording ink, which is an ink which can be cured by being irradiated with radiant rays such as ultraviolet rays, by ink-jetting and then irradiating the image with radiant rays such as ultraviolet rays to cure the ink.

In general, as compared to a water-based ink which contains water as a diluent and a solvent-type ink which contains an organic solvent as the diluent, an inkjet recording method based on a radiation-curable ink has merits such as wider application range of base materials due to its ability to print on non-absorbable base materials such as glass, metal, or plastic base materials, superior rub resistance and solvent resistance of an image formed thereby, higher sensitivity, higher productivity, or smaller affection on the human body or the environment due to smell or the like because a volatile solvent is not contained therein. Therefore, application of the inkjet recording method using the radiation-curable ink in industrial fields has been expected.

Pigments are widely used as coloring agents used in inks for inkjet recording of the radiation-curable ink, since pigments are excellent in light resistance or weatherability.

SUMMARY OF THE INVENTION

An ink composition for ultraviolet-curable inkjet recording which can contain pigments of various colors as its color material and is excellent in ejection stability is highly demanded.

In this regard, for example, Japanese Patent Application Laid-Open (JP-A) No. 2004-2528 describes an ultraviolet-curable ink composition for inkjet recording which contains C. I. Pigment Yellow 180 as a yellow pigment and a polymer dispersant, and states that an ultraviolet-curable yellow color ink for inkjet recording which is excellent in ejection stability and storage stability may be produced.

However, it is found that an image obtained using the ultraviolet-curable yellow color ink for inkjet recording described in JP-A No. 2004-2528 may have unevenness in density and streak-like unevenness and may not be satisfactory when the ink is used after a long-term storage or after aging at high temperatures.

Improvements in reduction of the unevenness in density and streak-like unevenness is desired for application of the ultraviolet-curable yellow color ink for inkjet recording after a long term storage or after aging at high temperatures.

The present invention is achieved in view of the above circumstances. The present invention provides a radiation-curable ink composition for inkjet recording which may have excellent ejection stability after long-term storage and/or after aging at high temperatures. The present invention further provides an inkjet recording method which uses the ink composition and may reduce the unevenness in density and streak-like unevenness. The present invention further provides a printed matter obtained by the inkjet recording method.

One aspect of the present invention is a radiation-curable ink composition for inkjet recording, the ink composition comprising: an azo compound represented by Formula (1), a tautomer of the azo compound, a salt of the azo compound, a salt of the tautomer, a hydrate of the azo compound, a hydrate of the tautomer, or any combination thereof; a polymer dispersant; a radical polymerizable compound; and a radical polymerization initiator.

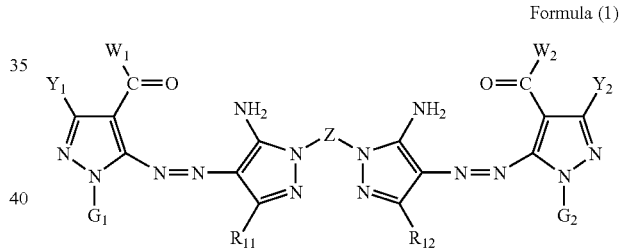

Formula (1)

In Formula (1): Z represents a divalent group having a 5- to 8-membered nitrogen-containing heterocycle; $Y_1$, $Y_2$, $R_{11}$ and $R_{12}$ each independently represent a hydrogen atom or a substituent; $G_1$ and $G_2$ each independently represent a hydrogen atom, an alkyl group, a cycloalkyl group, an aralkyl group, an alkenyl group, an alkynyl group, an aryl group or a heterocyclic group; and $W_1$ and $W_2$ each independently represent an alkoxy group, an amino group, an alkyl group, or an aryl group.

Another aspect of the present invention is an inkjet recording method comprising: ejecting the ink composition onto a recording medium; and curing the ejected ink composition by irradiating the ejected ink composition with active radiation.

Still another aspect of the present invention is a printed matter formed by the inkjet recording method. Specifically, the printed matter comprises, on a recording medium, an image formed from the radiation-curable ink composition for inkjet recording which is ejected onto the recording medium and cured by being irradiated with active radiation.

DETAILED DESCRIPTION OF THE INVENTION

The inventor of the invention has found out that a radiation-curable ink composition for ink jet recording which is excellent in ejection stability even after the long-term storage or after aging at high temperatures and may suppress density unevenness and streak-like unevenness may be obtained by employing, in the radiation-curable ink composition, an azo pigment having a carbonyl group which may form an intramolecular hydrogen bond with the carbon atom adjacent to the carbon atom to which an azo group is bonded.

(A) Azo Pigment

The azo pigment to be used in the invention is typically a compound represented by Formula (1). The azo pigment may be a compound having the structure represented Formula (1), a tautomer of the azo compound, a salt of the azo compound, a salt of the tautomer, a hydrate of the azo compound, a hydrate of the tautomer, and any combination thereof.

The pigment molecule of the compound represented by Formula (1) easily causes intramolecular or intermolecular interaction due to its specific structure. Since the compound has a low solubility in water or organic solvents, it may be used as the preferable azo pigment in exemplary embodiments of the invention.

The pigment is used by being finely-dispersed, as a solid particle such as a molecular aggregate, in a medium, and is different from a dye used by being dissolved in water or an organic solvent to be in a molecular dispersion state.

Formula (1)

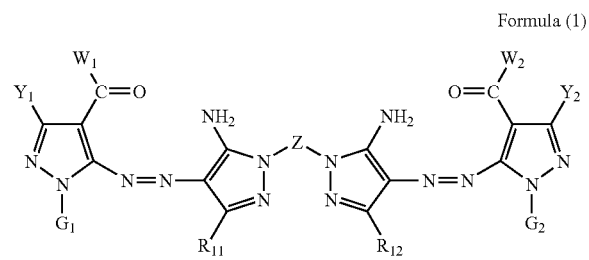

In Formula (1), Z represents a divalent group having a 5- to 8-membered nitrogen-containing heterocycle; $Y_1$, $Y_2$, $R_{11}$ and $R_{12}$ each independently represent a hydrogen atom or a substituent; $G_1$ and $G_2$ each independently represent a hydrogen atom, an alkyl group, a cycloalkyl group, an aralkyl group, an alkenyl group, an alkynyl group, an aryl group or a heterocyclic group; and $W_1$ and $W_2$ each independently represent an alkoxy group, an amino group, an alkyl group, or an aryl group.

In Formula (1), Z represents a divalent group having a 5- to 8-membered nitrogen-containing heterocycle. Preferable examples of the nitrogen-containing heterocycle, each of which may have one or more substituent at any position(s) thereof, include a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, and a pyridazine ring. More preferable examples include a 6-membered nitrogen-containing heterocycle such as a pyridine ring, a pyrimidine ring, or an s-triazine ring. Particularly preferable examples of Z include a divalent group having a pyrimidine ring.

When Z is a divalent group having a 6-membered nitrogen-containing heterocycle, the intramolecular and intermolecular interactions of pigment molecules may be more easily improved from the viewpoint of hydrogen bonding and planarity of the molecules.

In embodiments, the divalent group having a 5- to 8-membered nitrogen-containing heterocycle represented by Z may be condensed.

In Formula (1), $Y_1$ and $Y_2$ each independently represent a hydrogen atom or a substituent. Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

Herein, an "alkyl group" may be a straight chain alkyl group, a branched alkyl group, or a cyclic alkyl group, and may be a substituted- or unsubstituted-alkyl group. The scope of an alkyl group emcompass a cycloalkyl group, a bicycloalkyl group, and those having many ring structures such as a tricyclo structure. An alkyl group contained in a substituent (such as an alkyl group of an alkoxy group, an alkyl group of an alkylcarbonyl group or an alkyl group of an alkylsulfonyl group) also has this definition.

Preferable examples of $Y_1$ and $Y_2$ include a hydrogen atom, an alkyl group (such as a methyl group), an aryl group (such as a phenyl group), a heterocyclic group (such as a 2-pyridyl group), and an alkylthio group (such as a methylthio group), more preferable examples thereof include a hydrogen atom, a methyl group, a phenyl group, and a methylthio group, and particularly preferable examples thereof include a hydrogen atom. $Y_1$ and $Y_2$ may represent the same groups or groups which are different from each other.

In Formula (1), $R_{11}$ and $R_{12}$ each independently represent a hydrogen atom or a substituent. Examples of the substituent represented by $R_{11}$ or $R_{12}$ include a straight chain or branched alkyl group having from 1 to 12 carbon atoms such as methyl, ethyl, n-propyl, propyl, n-butyl, i-butyl, sec-butyl, t-butyl, 2-ethylhexyl, 2-methylsulfonylethyl, 3-phenoxypropyl, or trifluoromethyl; a straight chain or branched aralkyl group having from 7 to 18 carbon atoms such as a benzyl group; a straight chain or branched alkenyl group of having from 2 to 12 carbon atoms such as a vinyl group; a straight chain or branched alkynyl group having from 2 to 12 carbon atoms such as an ethynyl group; a straight chain or branched cycloalkyl group having from 3 to 12 carbon atoms such as a cyclopentyl group; a straight chain or branched cycloalkenyl group having from 3 to 12 carbon atoms such as a cyclopentenyl group; a halogen atom such as a chlorine atom or a bromine atom; an aryl group such as phenyl, 4-t-butylphenyl, or 2,4-di-t-amylphenyl; a heterocyclic group such as imidazolyl, pyrazolyl, triazolyl, 2-furyl, 2-thienyl, 2-pyrimidinyl, or 2-benzothiazolyl; a cyano group; a hydroxy group; a nitro group; a carboxy group; an amino group; an alkyloxy group such as methoxy, ethoxy, 2-methoxyethoxy, or 2-methylsulfonylethoxy; an aryloxy group such as phenoxy, 2-methylphenoxy, 4-t-butylphenoxy, 3-nitrophenoxy, 3-t-butyloxycarbonylphenoxy, or 3-methoxycarbonylphenyloxy; an acylamino group such as acetamido, benzamido, or 4-(3-t-butyl-4-hydroxyphenoxy)butaneamido; an alkylamino group such as methylamino, butylamino, diethylamino, or methylbutylamino; an arylamino group such as phenylamino or 2-chloroanilino; a ureido group such as phenylureido, methylureido, or N,N-dibutylureido; a sulfamoylamino group such as N,N-dipropylsulfamoylamino; an alkylthio group such as methylthio, octylthio, or 2-phenoxyethylthio), an arylthio group such as phenylthio, 2-butoxy-5-t-octylphenylthio, or 2-carboxyphenylthio; an alkyloxycarbonylamino group such as methoxycarbonylamino; an alkylsulfonylamino group and an arylsulfonylamino group such as methylsulfonylamino, phenylsulfonylamino, or p-toluenesulfonylamino; a carbamoyl group such as N-ethylcarbamoyl or N,N-dibutylcarbamoyl; a sulfamoyl group such as N-ethylsulfamoyl, N,N-dipropylsulfamoyl, or N-phenylsulfamoyl; a sulfonyl group such as methylsulfonyl, octylsulfonyl, phenylsulfonyl, or p-toluenesulfonyl; an alkyloxycarbonyl group such as methoxycarbonyl or butyloxycarbonyl; a heterocyclic oxy group such as 1-phenyltetrazole-5-oxy or 2-tetrahydropyranyloxy; an azo group such as phenylazo, 4-methoxyphenylazo, 4-pivaloylaminophenylazo, or 2-hydroxy-4-propanoylphenylazo; an acyloxy group such as acetoxy; a carbamoyloxy group such as N-methylcarbamoyloxy or N-phenylcarbamoyloxy; a silyloxy group such as trimethylsilyloxy or dibutylmethylsilyloxy; an aryloxycarbonylamino group such as phenoxycarbonylamino; an imido group such as N-succinimido or N-phthalimido; a heterocyclic thio group such as 2-benzothiazolylthio, 2,4-di-phenoxy-1,3,5-triazole 6-thio, or 2-pyridylthio; a sulfinyl group such as 3-phenoxypropylsulfinyl; a phosphonyl group such as phenoxyphosphonyl, octyloxyphosphonyl, or phenylphosphonyl; an aryloxycarbonyl group such as phenoxycarbonyl; an acyl group such as acetyl, 3-phenylpropanoyl, or benzoyl; and an ionic hydrophilic group such as a carboxy group, a sulfo group, a phosphono group or a quaternary ammonium group.

Preferable examples of $R_{11}$ and $R_{12}$ in Formula (1) include a substituted or unsubstituted acylamino group having from 1 to 8 carbon atoms, a substituted or unsubstituted alkyl group having from 1 to 12 carbon atoms, a substituted or unsubstituted aryl group having from 6 to 18 carbon atoms, and a substituted or unsubstituted heterocyclic group having from 4 to 12 carbon atoms, more preferable examples thereof include a straight chain or branched alkyl group having from 1 to 8 carbon atoms, and even more preferable examples thereof include a methyl group and a t-butyl group, and particularly preferable examples thereof include a t-butyl group. $R_{11}$ and $R_{12}$ may represent the same groups or groups which are different from each other.

$G_1$ and $G_2$ each independently represent a hydrogen atom, an alkyl group, a cycloalkyl group, an aralkyl group, an alkenyl group, an alkynyl group, an aryl group, or a heterocyclic group. Preferable examples of $G_1$ and $G_2$ include a hydrogen atom, a methyl group, an ethyl group, a n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group. More preferable examples thereof include a hydrogen atom, a methyl group, a phenyl group, a pyridyl group, a pyrimidinyl group, a pyrazinyl group. Particularly preferable examples among these include a methyl group, a 2-pyridyl group, a 2,6-pyrimidinyl group, and a 2,5-pyrazinyl group.

The alkyl group represented by $G_1$ or $G_2$ preferably has 5 or fewer carbon atoms, more preferably has 3 or fewer carbon atoms, and is particularly preferably a methyl group. $G_1$ and $G_2$ may represent the same groups or groups which are different from each other.

$W_1$ and $W_2$ each independently represent an alkoxy group, an amino group, an arylamino group pr a heterocyclic amino group.

Preferable examples of the alkoxy group represented by $W_1$ or $W_2$ include a substituted or unsubstituted alkoxy group having from 1 to 30 carbon atoms such as a methoxy group, an ethoxy group, an i-propoxy group, a t-butoxy group, an n-octyloxy group, or a 2-methoxyethoxy group.

Examples of the amino group represented by $W_1$ or $W_2$ include an alkylamino group, an arylamino group, and a heterocyclic amino group. Preferable examples thereof include an amino group, a substituted or unsubstituted alkylamino group having from 1 to 30 carbon atoms, a substituted or unsubstituted anilino group having from 6 to 30 carbon atoms, and specific examples thereof include a methylamino group, a dimethylamino group, an anilino group, an N-methyl-anilino group, and a diphenylamino group.

When $W_1$ or $W_2$ represents an alkyl group, the alkyl group may be a straight chain alkyl group, a branched alkyl group, or a cyclic alkyl group, and may be a substituted- or unsubstituted-alkyl group. The scope of the alkyl group emcompass a cycloalkyl group, a bicycloalkyl group, and those having many ring structures such as a tricyclo structure.

Preferable examples of the alkyl group include an alkyl group having from 1 to 30 carbon atoms such as a methyl group, an ethyl group, an n-propyl group, an i-propyl group, a t-butyl group, an n-octyl group, an eicosyl group, a 2-chloroethyl group, a 2-cyanoethyl group, or a 2-ethylhexyl group. Preferable examples of the cycloalkyl group include a substituted or unsubstituted cycloalkyl group having from 3 to 30 carbon atoms such as a cyclohexyl group, a cyclopentyl group, or a 4-n-dodecylcyclohexyl group. Preferable examples of the bicycloalkyl group include a substituted or unsubstituted bicycloalkyl group having from 5 to 30 carbon atoms, namely, a monovalent group in which a hydrogen atom is removed from bicycloalkane having from 5 to 30 carbon atoms, and specific examples thereof include a bicyclo [1.2.2] heptan-2-yl group and a bicyclo [2.2.2] octan-3-yl group.

Preferable examples of the aryl group represented by $W_1$ or $W_2$ include a substituted or unsubstituted aryl group having from 6 to 30 carbon atoms such as a phenyl group, a p-tolyl group, a naphthyl group, an m-chlorophenyl group, or an o-hexadecanoylaminophenyl group.

In preferable embodiments, $W_1$ and $W_2$ each independently represent an alkoxy group, an amino group or an alkyl group. In more preferable embodiments, $W_1$ and $W_2$ each independently represent an alkoxy group or an amino group. In still more preferable embodiments, $W_1$ and $W_2$ each independently represent an alkoxy group having 5 or fewer carbon atoms, an amino group (—$NH_2$), or an alkylamino group having 5 or fewer carbon atoms. In further preferable embodiments, $W_1$ and $W_2$ each independently represent an alkoxy group having 3 or fewer carbon atoms, an amino group, or an alkylamino group having 3 or fewer carbon atoms. In particularly preferable embodiments, $W_1$ and $W_2$ each independently represent a methoxy group.

When $W_1$ and $W_2$ each independently represent an alkoxy group having 5 or fewer carbon atoms, an amino group (—$NH_2$), or an alkylamino group having 5 or fewer carbon atoms, a pigment molecule easily forms a stronger hydrogen bond in the molecule and/or between the molecules, which is preferable from the viewpoints of a good hue and high fastness (for example, fastness against light, gas, heat, water, or chemicals).

$W_1$ and $W_2$ may represent the same groups or groups which are different from each other.

In embodiments, Z, $Y_1$, $Y_2$, $R_{11}$, $R_{12}$, $G_1$, $G_2$, $W_1$, and $W_2$ may each independently have a substituent. Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

The scope of the azo pigment used in the invention includes a tautomer of the azo compound represented by Formula (1). Formula (1) is shown as canonical structures among several tautomers with chemically acceptable structures. Tautomers having a structure other than the explicitly shown one may also be used in the invention. In embodiments, the azo pigment may be a mixture containing a plurality of such tautomers.

Examples of the azo pigment include a compound represented by the following Formula (1'), which is an azo-hydrazone tautomer of the compound represented by Formula (1). The use of the compound represented by Formula (1'), which is a tautomer of the azo compound represented by Formula (1), is included in the scope of the invention.

an ethyl group, an n-propyl group, an i-propyl group, a t-butyl group, or a cyclopropyl group) or an aryl group (such as a phenyl group, a p-tolyl group, or a naphthyl group). In preferable embodiments, $W_1$ and $W_2$ are each independently an alkoxy group, an amino group, or an alkyl group. In more preferable embodiments, $W_1$ and $W_2$ are each independently an alkoxy group or an amino group. In still more preferable embodiments, $W_1$ and $W_2$ are each independently an alkoxy group having 5 or fewer carbon atoms, an amino group (an —$NH_2$ group), or an alkylamino group having 5 or fewer carbon atoms. In particularly preferable embodiments, $W_1$ and $W_2$ are each independently an alkoxy group having 3 or fewer carbon atoms, an amino group (an —$NH_2$ group), or an alkylamino group having 3 or fewer carbon atoms. In specifically preferable embodiments, $W_1$ and $W_2$ are each independently a methoxy group (an —$OCH_3$ group).

(2) $R_{11}$ and $R_{12}$ are each independently a hydrogen atom or a substituent (such as a substituted or unsubstituted acylamino group having from 1 to 8 carbon atoms, a substituted or unsubstituted alkyl group having from 1 to 12 carbon atoms, a substituted or unsubstituted aryl group having from 6 to 18 carbon atoms, or a substituted or unsubstituted heterocyclic group having from 4 to 12 carbon atoms). In preferable embodiments, $R_{11}$ and $R_{12}$ are each independently a straight chain or branched alkyl group having from 1 to 8 carbon atoms. In more preferable embodiments, $R_{11}$ and $R_{12}$ are each independently a methyl group, an i-propyl group, or a t-butyl group. In particularly preferable embodiments, $R_{11}$ and $R_{12}$ are each independently a t-butyl group.

(3) Z represents a divalent group having a 5- to 8-membered heterocyclic ring and may be condensed. In preferable embodiments, Z is a 5- or 6-membered substituted or unsubstituted nitrogen-containing heterocyclic group such as a pyrrole ring, a pyrazole ring, a trirazole ring, an imidazole ring,

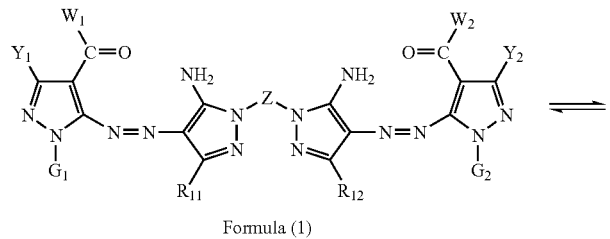

Formula (1)

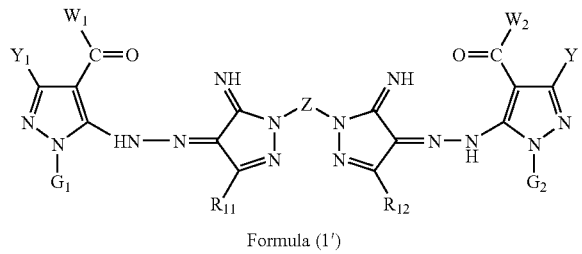

Formula (1')

$R_{11}$, $R_{12}$, $W_1$, $W_2$, $Y_1$, $Y_2$, $G_1$, $G_2$, and Z in Formula (1') respectively have the same definition as corresponding $R_{11}$, $R_{12}$, $W_1$, $W_2$, $Y_1$, $Y_2$, $G_1$, $G_2$, and Z in Formula (1).

In preferable embodiments, at least one of various substituents of the compound represented by Formula (1) is selected from the above-described preferable groups. The larger the number of substituents selected from the above-described preferable groups is, the more preferable it is. In particularly preferable embodiments, all substituents of the compound represented by Formula (1) are selected from the above-described preferable groups.

Particularly preferable examples of the azo compound represented by Formula (1) include those satisfying at least one of the following (1) to (5).

(1) $W_1$ and $W_2$ are each independently an alkoxy group (such as a methoxy group, an ethoxy group, an i-propoxy group, or a t-butoxy group), an amino group (such as an —$NH_2$ group, a methylamino group, a dimethylamino group, or an anilino group), an alkyl group (such as a methyl group, a thiazole ring, an isothiazole ring, an oxazole ring, an isoxazole ring, a thiadiazole ring, a thiophene ring, a furan ring, a pyridine ring, a pyrimidine ring, a triazine ring, or a pyridazine ring. In more preferable embodiments, Z is a 6-membered nitrogen-containing heterocyclic group having from 3 to 10 carbon atoms. Preferable examples of the heterocycle include a pyridine ring, a pyrimidine ring, an s-triazine ring, a pyridazine ring, and a pyrazine ring. More preferable examples of the heterocycle include a pyridine ring, a pyrimidine ring, an s-triazine ring, a pyridazine ring, and a pyrazine ring. Further preferable examples of the heterocycle include a pyrimidine ring and an s-triazine ring. Particularly preferable examples of the heterocycle include a pyrimidine ring.

(4) $G_1$ and $G_2$ each independently represent a hydrogen atom, an alkyl group, a cycloalkyl group, an aralkyl group, an alkenyl group, an alkynyl group, an aryl group, or a heterocyclic group. In preferable embodiments, $G_1$ and $G_2$ each independently represent a hydrogen atom, a methyl group, an ethyl group, a n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group. In more preferable embodiments, $G_1$ and $G_2$ each independently represent a hydrogen atom, a methyl group, a phenyl group, a pyridyl group, a pyrimidinyl group, or a pyrazinyl group. In particularly preferable embodiments, $G_1$ and $G_2$ each independently represent a methyl group, a 2-pyridyl group, a 2,6-pyrimidinyl group, or a 2,5-pyrazinyl group.

The alkyl group represented by $G_1$ or $G_2$ preferably has 5 or fewer carbon atoms, more preferably has 3 or fewer carbon atoms, and is particularly preferably a methyl group.

(5) $Y_1$ and $Y_2$ each independently represent a hydrogen atom, an alkyl group (such as a methyl group), an ryl group (such as a phenyl group), a heterocyclic group (such as a 2-pyridyl group), or an alkylthio group (such as a methylthio group). In preferable embodiments, $Y_1$ and $Y_2$ each independently represent a hydrogen atom, a methyl group, a phenyl group, or a methylthio group. In more preferable embodiments, $Y_1$ and $Y_2$ each independently represent a hydrogen atom.

Preferable examples of the azo compound represented by Formula (1) include the azo compound represented by the following Formula (2).

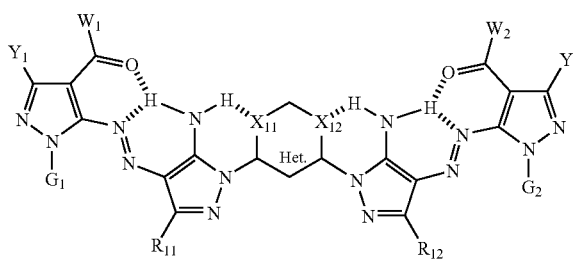

Formula (2)

$G_1$, $G_2$, $R_{11}$, $R_{12}$, $W_1$, $W_2$, $Y_1$, and $Y_2$ in Formula (2) respectively have the same definition as that of corresponding $G_1$, $G_2$, $R_{11}$, $R_{12}$, $W_1$, $W_2$, $Y_1$, and $Y_2$ in Formula (1).

$X_{11}$ and $X_{12}$ each independently represent a heteroatom in a divalent group (Het.) having a nitrogen-containing heterocycle represented by Z in Formula (4).

There are a lot of tautomers of the azo compound represented by Formula (1) and employable in the invention.

In preferable embodiments, the azo compound represented by Formula (1) may have a substituent which forms an intramolecular hydrogen bond or an intramolecular cross hydrogen bond. It is preferable that the azo compound represented by Formula (1) has at least one of the substituent which forms an intramolecular cross hydrogen bond. It is more preferable that the azo pigment has at least three of the substituent which forms an intramolecular hydrogen bond. It is particularly preferable that the azo pigment has at least three of the substituent which forms an intramolecular hydrogen bond and at least two of the hydrogen bonds form an intramolecular cross hydrogen bond.

The reason why the azo compound represented by Formula (2) is preferable may be that, in the structure Formula (2), a nitrogen atom which forms a heterocyclic group, a hydrogen atom, and a heteroatom (a nitrogen atom of an azo group or its tautomer, i.e., hydrazone group, an oxygen atom of a carbonyl group or a nitrogen atom of an amino group) contained in an azo pigment structure easily form at least one intramolecular cross hydrogen bond (intramolecular hydrogen bond).

Further preferably, as shown in Formula (2), a nitrogen atom which forms a heterocyclic group, a hydrogen atom of an amino group, and a heteroatom (for example, a nitrogen atom of an azo group or its tautomer, i.e., hydrazone group, an oxygen atom of a carbonyl group or a nitrogen atom of an amino group) contained in an azo pigment structure easily form at least four intramolecular hydrogen bonds and easily form at least two intramolecular cross hydrogen bonds.

As a result, the planarity of the molecules is improved and intramolecular and intermolecular interactions are improved. For example, the crystallinity of the azo compound represented by Formula (2) becomes high (namely, the azo pigment becomes to easily form a higher order structure), so that performances required to the pigment such as lightfastness, thermal stability, wet heat stability, waterproof properties, gas resistance or solvent resistance may be significantly improved.

An isotope (such as $^2H$, $^3H$, $^{13}C$, or $^{15}N$) may be contained in the compound represented by Formula (1).

Hereinafter, Pig.-1 to Pig.-46 will be exemplified as specific examples of the azo pigments represented by Formula (1). However, the azo pigment to be used in the invention is not limited thereto. The structures of the following specific examples are respectively shown as a canonical structure among several tautomers with chemically acceptable structures, although the azo pigment may have a structure of any one of tautomers thereof.

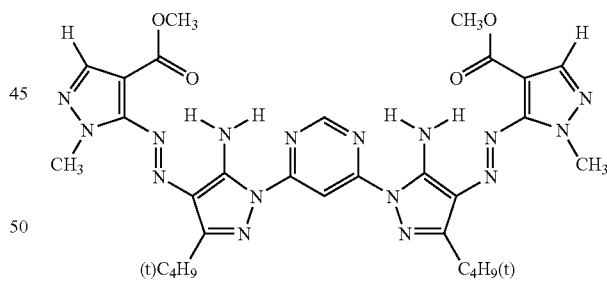

Pig.-1

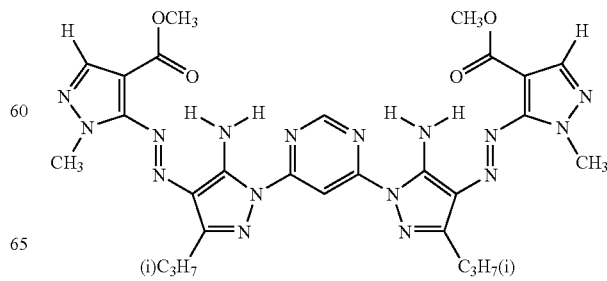

Pig.-2

-continued

-continued

-continued

Fig.-43
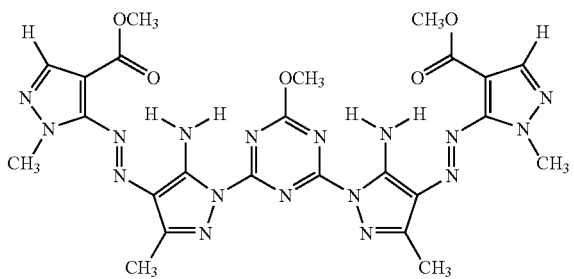

Fig.-44
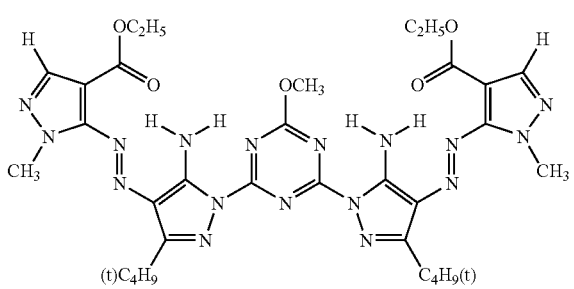

Fig.-45
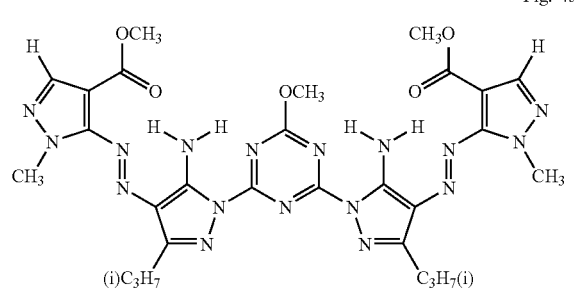

Fig.-46
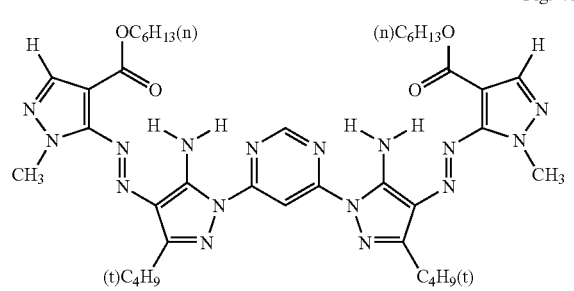

There is no particular limitation to the azo compound represented by Formula (1) as long as its chemical structure is that of Formula (1) or that of any one of tautomers thereof. There is also no particular limitation to a crystalline form thereof. The pigment may have any crystalline form, and examples thereof include a so-called polymorph (crystalline polymorph).

The "crystalline polymorph" of one compound is a crystal which has the same composition as the compound, but the arrangement of building block (molecule or ion) in the crystal is different from that in the compound. Chemical and physical properties of the crystalline polymorph may be determined by its crystal structure. Prulal crystalline polymorphs may be distinguished from each other according to rheology, hue, and other color characteristics. Difference in prulal crystalline polymorphs may be confirmed by X-Ray Diffraction (powder X-ray diffraction measurement result) or X-Ray Analysis (X-ray crystal structure analysis result).

When the azo compound represented by Formula (1) in the invention has a crystalline polymorph, the crystal form may be that of any polymorphs thereof, and may be a mixture of two or more polymorphism although it is preferable that the azo pigment has a single crystalline polymorph as a main component. That is, it is preferable that the azo pigment has smaller contamination with crystalline polymorph. The content of the azo pigment having a single crystal form is typically from 70% to 100%, preferably from 80% to 100%, more preferably from 90% to 100%, further preferably from 95% to 100%, and particularly preferably 100% based on the total amount of the azo pigment.

When the azo pigment contains, as a main component, a compound having a single crystal form, the regularity for the arrangement of pigment molecules may be improved and the intramolecular and intermolecular interactions may be enhanced. Thus, a high level three-dimensional network is easily formed. As a result, performances required for the pigment such as improvement in the hue, lightfastness, heat fastness, humidity fastness, oxidizing gas fastness, or solvent resistance may be improved.

The content of the crystalline polymorph based on a total amount of the azo pigment may be confirmed by the value of the solid which is physicochemically measured by Single crystal X-ray crystal structure analysis, Powder X diffraction (XRD), Micrograph (TEM) of crystal, or IR (KBr method).

In the invention, when the azo compound represented by Formula (1) has acid groups, a part or all of the acid groups may be in a form of salt, or a salt-form pigment and a free acid-form pigment may be present as a mixture. Examples of the form of salt include a salt of alkali metals such as Na, Li, or K; a salt of ammonium which may be substituted by an alkyl group or a hydroxyalkyl group; and a salt of organic amine. Examples of the organic amine include lower alkylamine, hydroxy-substituted lower alkylamine, carboxy-substituted lower alkylamine, and polyamine having from 2 to 10 alkyleneimine units, each of the units having from 2 to 4 carbon atoms. Either a pigment of a single salt-form or pigments of prulal salt-forms may be present in the azo pigment.

When a plurality of acid groups are included in one molecule of the azo pigment used in the invention, the plurality of acid groups may be independently a salt form or an acid form, and may be different from each other.

In the invention, the azo pigment a hydrate of the azo compound represented by Formula (1) and containing water molecules in the crystal. The number of water molecules in the crystal is not particularly limited.

Examples of the production method of the azo compound represented by Formula (1) include a method in which a heterocyclic amine represented by Formula (A) described below is diazotized under acid condition; the resulting product is subjected to coupling reaction with the compound represented by the following Formula (B); and the resulting product is subjected to post-treatment in a conventional manner to produce the azo compound represented by Formula (1).

Formula (A)
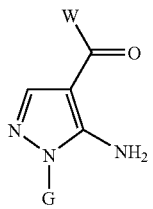

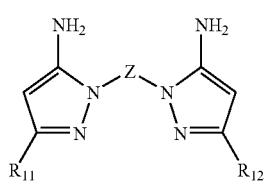

Formula (B)

In Formulae (A) and (B), W has the same definition as that of $W_1$ or $W_2$ in Formula (1); G has the same definition as that of $G_1$ or $G_2$ in Formula (1); and $R_{11}$, $R_{12}$ and Z respectively has the same definition as that of corresponding $R_{11}$, $R_{12}$ and Z.

The heterocyclic amine represented by Formula (A) may be generally produced by a well-known and common used method (for example, the method described in Helv. Chim. Acta, 41, 1958, 1052-1056, and the method described in Helv. Chim. Acta, 42, 1959, 349-352; the disclosures of which are incorporated by reference herein), or any method which substantially accords with any of these.

The compound represented by Formula (B) may be produced by the methods described in WO 06/082669 or JP-A No. 2006-57076, or any method which substantially accords with any of these.

The diazotizing reaction of the heterocyclic amine represented by Formula (A) may be performed by allowing the heterocyclic amine to react with reagents such as sodium nitrite, nitrosylsulfuric acid, and isoamyl nitrite in an acidic solvent such as sulfuric acid, phosphoric acid, acetic acid, hydrochloric acid, or methanesulfonic acid at a temperature of 15° C. or lower for about 10 minutes to about 6 hours.

The coupling reaction may be carried out by reacting the diazonium salt obtained by the above-described method with the compound represented by Formula (B) at 40° C. or lower, preferably at 25° C. or lower, for about 10 minutes to about 12 hours.

Generally, a crystal is obtained by adding water or an alcohol solvent to the reaction liquid to precipitate the crystal and then performing filtration, although the crystal may have been precipitated in the reaction liquid in some cases. Alternatively, such a crystal is obtained by adding the reaction liquid to an alcohol solvent or water to precipitate the crystal and then performing filtration. The thus obtained may be further washed and dried if necessary to obtain the azo compound represented by Formula (1).

The azo compound represented by Formula (1) is obtained as a crude azo pigment by the above production method. In preferable embodiments, such a elude azo pigment is subjected to post-treatment for being employed in the invention. Examples of the post-treatment include: pigment particle regulation by milling such as solvent salt milling, salt milling, dry milling, solvent milling, or acid pasting, and/or by heating a solvent; and surface treatment of pigment particles with resins, surfactants, and/or dispersing agents.

In preferable embodiments, the azo compound represented by Formula (1) subjected to post-treatment by solvent heating treatment and/or solvent salt milling is used in the invention.

Examples of the solvent to be used for the solvent heating treatment include water; aromatic hydrocarbon solvents such as toluene and xylene; halogenated hydrocarbon solvents such as chlorobenzene or o-dichlorobenzene; alcohol solvents such as i-propanol or i-butanol; polar aprotic organic solvents such as N,N-dimethylformamide, N,N-dimethylacetamide, or N-methyl-2-pyrrolidone; glacial acetic acid, pyridine, and mixtures thereof. Organic or inorganic acids or bases may be further added to the above-described solvents. The temperature of solvent heating treatment varies depending on the primary particle diameter of the desired pigment. In preferable embodiments, the temperature is from 40° C. to 150° C., and in more preferable embodiments, the temperature is from 60° C. to 100° C. The time for the treatment is preferably from 30 minutes to 24 hours.

Examples of the solvent salt milling include a method including placing, into a kneading machine, a crude azo pigment, an inorganic salt, and an organic solvent in which the organic salt is insoluble, and performing kneading and grinding. A water-soluble inorganic salt may be suitably used as the inorganic salt. Preferable examples thereof include inorganic salts such as sodium chloride, potassium chloride or sodium sulfate. In preferable embodiments, the inorganic salt have an average particle diameter of 0.5 µm to 50 µm. The amount of the inorganic salt is preferably from 3 parts by mass to 20 parts by mass, and more preferably from 5 parts by mass to 15 parts by mass with respect to the crude azo pigment. A water-soluble organic solvent may be suitably used as the organic solvent. Since the solvent may easily evaporate due to the temperature rise at the time of kneading, a high-boiling-point solvent is preferable from a viewpoint of safety.

Examples of the organic solvent include diethylene glycol, glycerol, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and mixtures thereof. The amount of the water-soluble organic solvent is preferably from 0.1 to 5 times of an amount of the crude azo pigment. The kneading temperature is preferably from 20° C. to 130° C., and particularly preferably from 40° C. to 110° C. Examples of the kneading machine include kneaders and mix maulers.

In preferable embodiments, pigments, dispersants, and media are selected and dispersion conditions and filtration conditions are set so that the average particle diameter of azo pigment particles represented by Formula (1) is in a range of from 0.005 pin to 0.5 µm, more preferably in a range of from 0.01 to µm 0.45 µm, further preferably in a range of from 0.015 µm to 0.4 µm.

The ink composition of the invention may contain at least one of the azo compound represented by Formula (1), a tautomer of the azo compound, a salt of the azo compound or the tautomer, and a hydrate of the azo compound or the tautomer. Two or more of them may be used in combination.

The content of the azo compound represented by Formula (1) and its tautomer, as well as salts and hydrates thereof is preferably in a range of from 0.1% by mass to 10% by mass, more preferably in a range of from 1% by mass to 7% by mass, and further preferably in a range of from 2% by mass to 5% by mass based on the total amount of the ink composition.

When the content of the azo compound represented by Formula (1), a tautomer of the azo compound, a salt of the azo compound or the tautomer, and a hydrate of the azo compound or the tautomer is within such range, a desired yellow color hue may be obtained and an excellent ejection stability may be provided.

The ink composition of the invention may further contain an optional pigment other than the azo compound represented by Formula (1). Examples of the optional pigment include C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, and 180. When such optional pigment is used in combination with the azo compound represented by Formula (1), the content of the azo compound represented by Formula (1) is preferably 20% by mass or more, and is more preferably 30% by mass or more, based on the total amount of pigments contained in the ink composition.

(B) Polymer Dispersant

The ink composition of the invention contains a polymer dispersant.

Mixing and dispersing the azo compound represented by Formula (1) is preferably carried out in the presence of the polymer dispersant.

The "polymer dispersant" herein means a dispersant having a weight-average molecular weight of 1,000 or more.

A main chain skeleton of the polymer dispersant is not particularly limited. Examples of the main chain skeleton include a polyurethane skeleton, a polyacrylic skeleton, a polyester skeleton, a polyamide skeleton, a polyimide skeleton, and a polyurea skeleton. From the viewpoint of the storage stability of the ink composition, the polyurethane skeleton, the polyacrylic skeleton, and the polyester skeleton are preferable.

A structure of the polymer dispersant is not particularly limited. Examples of the structure of the polymer dispersant include a random polymer structure, a block polymer structure, a comb-shaped polymer structure, and a star-shaped polymer structure. The block polymer structure and the comb-shaped polymer structure are preferable from the viewpoint of the storage stability of the ink composition.

Specific examples of the polymer dispersant include wetting dispersants DISPER BYK 101, 102, 103, 106, 108, 109, 110, 111, 112, 116, 130, 140, 142, 145, 161, 162, 163, 164, 166, 167, 168, 170, 171, 174, 108, 182, 183, 184, 185, 2000, 2001, 2020, 2050, 2070, 2096, and 2150 (trade names, manufactured by BYK Chemie GmbH), EFKA 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, and 5244 (trade names, manufactured by Ciba Specialties Chemicals), SOLSPERSE 3000, 5000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 53095, 54000, 55000, 56000, and 71000 (trade names, manufactured by The Lubrizol Corporation), DISPAR LON 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401, and DA-7301 (trade names, manufactured by Kusumoto Chemicals, Ltd.), AJISPER PB-711, PB-821, PB-822, PN-411, and PA-111 (trade names, manufactured by Ajinomoto-Fine-Techno Co., Inc.), SURFYNOL 104A, 104C, 104E, 104H, 104S, 104BC, 104DPM, 104PA, 104PG-50, 420, 440, DF110D, DF110L, DF37, DF58, DF75, DF210, CT111, CT121, CT131, CT136, GA, TG, and TGE (trade names, manufactured by Air Products and Chemicals, Inc.), OLFINE, STG, and E1004 (trade names, manufactured by Nissin Chemical Industry Co., Ltd.), SN SPERSE 70, 2120, and 2190 (trade names, manufactured by SAN NOPCO LIMITED), ADEKA COL series and ADEKA TOL series (trade names, manufactured by ADEKA CORPORATION), SANNONIC series, NAROACTY CL series, EMULMIN series, NEWPOL PE series, IONET M series, IONET D series, IONET S series, IONET T series, and SANSPEARL 100 (trade names, manufactured by Sanyo Chemical Industries, Ltd.).

The amount of the polymer dispersant in the ink composition is preferably set so that the ratio (D/P) becomes $0.01 \leqq D/P \leqq 1.5$, more preferably $0.03 \leqq D/P \leqq 1.0$, further preferably $0.05 \leqq D/P \leqq 0.6$, in which P represents the content of the pigment in the ink composition and D represents the content of the polymer dispersant (B) in the ink composition.

When such condition is satisfied, the pigment may not aggregate or precipitate, and the ink viscosity may not be increased, and thus the ink composition may become excellent in storage stability. Further, the ink viscosity may be low, and thus the ink composition may become excellent in ejection stability.

(C) Radical Polymerizable Compound

The ink composition of the invention contains a radical polymerizable compound.

The radical polymerizable compound may be any compound as long as it has at least one radically polymerizable ethylenically unsaturated bond in the molecule. The chemical form of the compound may be a monomer, oligomer, polymer, or the like. Only one radical polymerizable compound may be used, or alternatively two or more radical polymerizable compounds may be used in an arbitrary amount ratio for the improvement of the target properties. Use of two or more compounds in combination is preferable in view of the control of the reactivity and properties such as physical properties.

In preferable embodiments, the ink composition contains, as the radical polymerizable compound, at least one compound selected from the group consisting of an aromatic monofunctional ethylenically unsaturated compound, N-vinyllactams, a monofunctional ethylenically unsaturated compound having an aliphatic cyclic structure, and a polyfunctional ethylenically unsaturated compound.

Aromatic monofunctional ethylenically unsaturated compound and Monofunctional ethylenically unsaturated compound having Aliphatic cyclic structure The monofunctional ethylenically unsaturated compound having an aliphatic cyclic structure and the aromatic monofunctional ethylenically unsaturated compound are preferably a monofunctional ethylenically unsaturated compound represented by Formula (C). The monofunctional ethylenically unsaturated compound having an aliphatic cyclic structure is a monofunctional ethylenically unsaturated compound having an alicyclic hydrocarbon group in which the alicyclic hydrocarbon group may contain a hetero atom. The aromatic monofunctional ethylenically unsaturated compound is a monofunctional ethylenically unsaturated compound having an aromatic group.

The monofunctional ethylenically unsaturated compound is a radical polymerizable monomer and is a monomer having only one polymerizable ethylene unsaturated bond. Preferable examples of the group which has the polymerizable ethylene unsaturated bond include an acryloyloxy group, a methacryloyloxy group, an acrylamide group, a methacrylamide group, a vinyl group, and a vinyloxy group.

Herein, the monofunctional ethylenically unsaturated compound (radical polymerizable monomer) having an aliphatic cyclic structure has an ethylenically unsaturated bond which is apart from the aliphatic cyclic structure. An ethylenically unsaturated bond included in the aliphatic cyclic structure does not correspond to the polymerizable ethylenically unsaturated bond. The aromatic monofunctional ethylenically unsaturated compound is a compound which has one ethylenically unsaturated bond which is apart from an aromatic group.

Specific examples of the monofunctional ethylenically unsaturated compound having an aliphatic cyclic structure and the aromatic monofunctional ethylenically unsaturated compound include radical polymerizable monomers described in paragraphs [0194] to [0207] of JP-A No. 2008-87248 and these compounds may be suitably used in the invention.

N-Vinyllactams

Examples of the radical polymerizable compound include N-vinyllactams.

Preferable examples of the N-vinyllactams include a compound represented by the following Formula (C).

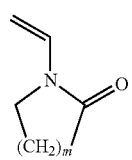

Formula (C)

In Formula (C), m represents an integer of 1 to 5. From the viewpoint of the flexibility after curing of the ink composition, the adhesion with the recorded medium, and the availability of the raw material, m is preferably an integer of 2 to 4, more preferably an integer of 2 or 4, particularly preferably an integer of 4. Namely, the compound represented by Formula (C) is N-vinylcaprolactam. N-vinylcaprolactam is excellent in safety, is used widely, and is available at a relatively low cost, and may provide particularly excellent ink curability and the adhesion of the cured film to the recorded medium.

N-vinyllactams may have substituent groups such as an alkyl group or an aryl group on its lactam ring, and may further have a saturated- or unsaturated-ring structure.

One or more of the N-vinyllactams may be contained in the ink composition.

Polyfunctional Ethylenically Unsaturated Compound

Examples of the radical polymerizable compound used in the invention include a polyfunctional ethylenically unsaturated compound having two or more ethylenically unsaturated double bond groups selected from the group consisting of an acrylate group, a methacrylate group, an acrylamide group, a methacrylamide group, a vinyloxy group, and an N-vinyl group. Hereinafter, the polyfunctional ethylenically unsaturated compound may be also referred to as a polyfunctional monomer.

An image having high cured film strength may be obtained when the ink composition contains the polyfunctional monomer.

Specific examples of the polyfunctional monomer include bis(4-acryloxypolyethoxyphenyl) propane, neopentylglycol di(meth)acrylate, 1,6-hexanediol di(meth)acrylate, 1,9-nonanediol di (meth)acrylate, ethyleneglycol di(meth)acrylate, diethyleneglycol di(meth)acrylate, triethyleneglycol di(meth)acrylate, tetraethyleneglycol di(meth)acrylate, polyethyleneglycol di(meth)acrylate, dipropyleneglycol di(meth) acrylate, tripropyleneglycol di(meth)acrylate, tetrapropyleneglycol di(meth)acrylate, polypropyleneglycol di(meth) acrylate, pentaerythritol tri(meth)acrylate, pentaerythritol tetra(meth)acrylate, dipentaerythritol tetra(meth)acrylate, trimethylolpropane (meth)acrylate, tetramethylolmethane tetra(meth)acrylate, tetramethylolmethanetri (meth)acrylate, dimethyloltricyclodecane di(meth)acrylate, modified glyc- erin tri(meth)acrylate, modified bisphenol A di(meth)acrylate, PO adduct of bisphenol A di(meth)acrylate, EO adduct of bisphenol A di(meth)acrylate, dipentaerythritol hexa(meth)acrylate, and caprolactone-modified dipentaerythritol hexa(meth)acrylate.

Particularly, a polyfunctional acyclic monomer, which does not have a cyclic structure, is preferable.

The total amount of the radical polymerizable compound (C) is preferably 40% by mass to 95% by mass, more preferably 50% by mass to 90% by mass, and further preferably 60% by mass to 85% by mass, based on the total of the ink composition to be used in the invention. When the total amount is within the range, an excellent curability and an appropriate viscosity may be obtained.

When the aromatic monofunctional ethylenically unsaturated compound is contained as the radical polymerizable compound, the content of the aromatic monofunctional ethylenically unsaturated compound is preferably 80% by mass or less, more preferably 5% by mass to 70% by mass, and further preferably 10% by mass to 50% by mass based on the total amount of the ink composition. When the content is within such range, the ink composition may be adjusted so as to have an appropriate viscosity to provide excellent inkjet discharge properties.

When N-vinyllactams are used as the radical polymerizable compound, the content of the N-vinyllactams is preferably 50% by mass or less, more preferably 5% by mass to 45% by mass, and further preferably 10% by mass to 40% by mass based on the total amount of the ink composition. When the content is within the range, the N-vinyllactams may reveal good copolymerizability with other radical polymerizable compounds to make the ink composition be excellent in curability.

When the monofunctional ethylenically unsaturated compound having an aliphatic cyclic structure is used as the radical polymerizable compound, the content is preferably 50% by mass, more preferably 5% by mass to 45% by mass or less, and further preferably 10% by mass to 40% by mass based on the total amount of the ink composition. When the content is within the range, an ink composition excellent in curability and rub resistance may be obtained.

From the viewpoint of retaining the adhesion of the cured film to the base material (recorded medium), the amount of the polyfunctional monomer is preferably 50% by mass or less, and more preferably from 0% by mass to 60% by mass based on the total amount of the composition. Particularly, in order to obtain a flexible cured film, the amount is preferably from 0% by mass to 40% by mass, and more preferably from 1% by mass to 30% by mass.

Other Polymerizable Compounds

As the radical polymerizable compound, the following acyclic monofunctional monomers may be used in combination.

The viscosity of acyclic monofunctional monomers is relatively low and it may be preferably used in view of, for example, lowering the viscosity of the ink composition. From the viewpoint of suppressing the stickiness of the cured film and providing a high film strength without causing any damage at the time of molding, the proportion of the acyclic monofunctional monomers to the total amount of the ink composition is preferably 20% by mass or less, and more preferably 15% by mass or less.

Specific examples of the acyclic monofunctional monomer include octyl (meth)acrylate, 2-ethylhexyl (meth)acrylate, decyl (meth)acrylate, dodecyl (meth)acrylate, tridecyl (meth) acrylate, tetradecyl (meth)acrylate, hexadecyl (meth)acrylate, 2-hydroxyethyl (meth)acrylate, butoxyethyl (meth)acrylate, carbitol (meth)acrylate, 2-ethylhexyldiglycol (meth) acrylate, polyethyleneglycol (meth) acrylatemonomethylether, polypropyleneglycol (meth) acrylatemonomethylether, and polytetraethyleneglycol (meth)acrylatemonomethylether.

Examples of the radical polymerizable compound further include unsaturated carboxylic acids such as acrylic acid, methacrylic acid, itaconic acid, crotonic acid, isocrotonic acid, or maleic acid, salts of these, anhydrides having an ethylene unsaturated group, acrylonitrile, various unsaturated polyesters, unsaturated polyether, unsaturated polyamide, unsaturated urethane (meth)acrylic-monomer or prepolymer, and (meth)acrylic esters such as those formed from urethane-monomer or prepolymer.

Examples of the radical polymerizable compound further include a vinyl ether compound. Preferable examples of the vinyl ether compound include di- or tri-vinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexane dimethanol divinyl ether, hydroxyethyl monovinyl ether, hydroxy nonylmonovinyl ether, or trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutylvinyl ether, 2-ethylhexyl vinyl ether, cyclohexane dimethanol monovinyl ether, n-propylvinyl ether, isopropyl vinyl ether, isopropenyl vinyl ether, dodecyl vinyl ether, diethylene glycol monovinyl ether, or octadecyl vinyl ether.

Among these vinyl ether compounds, the divinyl ether compound and the trivinyl ether compound are preferable from the viewpoint of the curability, adhesion, and surface hardness. Particularly, the divinyl ether compound is preferable. The vinyl ether compound may be used singly or two or more thereof in combination. The vinyl ether compound may be preferably used for the purpose of lowering the viscosity. Excessive amount of the vinyl ether compound contained in the ink composition may cause deterioration of curability and stickiness of the cured film surface. The amount of the vinyl ether compound is preferably 20% by mass or less, more preferably 10% by mass or less based on the total amount of the ink composition.

(D) Radical Polymerization Initiator

The ink composition of the invention contains a radical polymerization initiator (hereinafter sometimes referred to as a "polymerization initiator", "photo polymerization initiator", or "photoinitiator"). Known radical polymerization initiators may be preferably used as the radical polymerization initiator. The radical polymerization initiator to be used in the invention may be used singly or in combination of two or more thereof.

The radical polymerization initiator to be used in the invention is a compound which generates polymerization initiation species by being irradiated with active radiation. Examples of the active radial rays include γ-rays, β-rays, electron rays, ultraviolet rays, visible rays, and infrared rays. From the viewpoint of the apparatus cost and operational safety, ultraviolet rays or visible rays are preferable.

Any polymerization initiator that is known to those having ordinary skill in the art may be used in the invention without particular limitation. Specific examples thereof are extensively described in Bruce M. Monroe, et al., Chemical Revue, 93 435 (1993) or R. S. Davidson, Journal of Photochemistry and Biology A: Chemistry, 73, 81 (1993); J. P. Faussier, "Photoinitiated Polymerization—Theory and Applications": Rapra Review Vol. 9, Report, Rapra Technology (1998); M. Tsunooka et al., Prog. Polym. Sci., 21, 1 (1996); and the like. Many compounds employable for chemically amplified photoresists or photocationic polymerization are described in "Organic materials for Imaging" pp. 187-192 (1993) edited by Japanese Research Association for Organic Electronics Materials, published by BUNSHIN SHUPPAN. Also known is a family of compounds which oxidatively or reductively cause bond cleavage, such as those described in F. D. Saeva, Topics in Current Chemistry, 156, 59 (1990); G. G. Maslak, Topics in Current Chemistry, 168, 1 (1993); H. B. Shuster et al., JACS, 112, 6329 (1990); I. D. F. Eaton et al., JACS, 102, 3298 (1980); and the like.

Preferable examples of the radical polymerization initiator include (a) aromatic ketone, (b) acylphosphine compound, (c) aromatic onium salt compound, (d) organic peroxide, (e) thio compound, (f) hexaarylbiimidazole compound, (g) keto oxime ester compound, (h) borate compound, (i) azinium compound, (j) metallocene compound, (k) active ester compound, (l) compound having a carbon-halogen bond, and (m) alkylamine compound.

In the invention, the radical polymerization initiator preferably contains at least one selected from the group consisting of acyl phosphine oxide compounds and α-aminoacetophenone compounds. When these compounds are used as the radical polymerization initiator, particularly, highly sensitive curing may be achieved.

Specific examples of the acyl phosphine oxide compound which may be suitably used in the invention include compounds described in paragraphs [0059] to [0077] of JP-A No. 2008-246832.

Specific examples of the α-aminoacetophenone compound which may be suitably used in the invention include compounds described in paragraphs [0078] to [0096] of JP-A No. 2008-246832.

Other Radical Polymerization Initiators

In the invention, radical polymerization initiators other than described above may be contained as the radical polymerization initiator.

Examples of such radical polymerization initiators include an α-hydroxy acetophenone compound and an oxime ester compound.

Specific examples of the α-hydroxy acetophenone compound which may be suitably used in the invention include compounds described in paragraphs [0097] to [0100] of JP-A No. 2008-246832.

Specific examples of the oxime ester compound which may be suitably used in the invention include compounds described in paragraphs [0101] to [0105] of JP-A No. 2008-246832.

The total content of the radical polymerization initiator in ink composition of the invention is preferably 0.01% by mass to 35% by mass, more preferably 0.5% by mass to 20% by mass, and further preferably 1.0% by mass to 15% by mass based on the ink composition. When the amount is 0.01% by mass or more, the composition may be sufficiently cured. When the amount is 35% by mass or less, a cured film having a uniform cure degree may be obtained.

In the invention, it is preferable to use the acyl phosphine oxide compound as the radical polymerization initiator. The content of the acyl phosphine oxide compound is preferably 0.01% by mass to 35% by mass, more preferably 1% by mass to 25% by mass, and further preferably 3% by mass to 20% by mass based on the total amount of the ink composition.

When a sensitizer (sensitizing dye) described below is used in the ink composition of the invention, the total content of the radical polymerization initiator relative to that of the sensitizer (namely, the ratio of (the total content of the radical polymerization initiator):(the total content of the sensitizer)) is preferably from 200:1 to 1:200, more preferably from 50:1 to 1:50, and further preferably from 20:1 to 1:5.

(E) Other Components

In addition to the components (A) to (D), the ink composition of the invention may contain other components described in the following.

(E-1) Sensitizing Dye

A sensitizing dye may be used in the ink composition of the invention in view of improving the sensitivity of the radical polymerization initiator (D). Preferable examples of the sensitizing dye include those belonging to the following compounds and revealing absorption of light with a wavelength of from 350 to 450 nm.

Examples of the sensitizing dye include polynuclear aromatics (e.g. pyrene, perylene, and triphenylene), xanthenes (e.g. fluorescein, cosine, erythrosine, rhodamine B, and rose bengal), cyanines (e.g. thiacarbocyanine and oxacarbocyanine), merocyanines (e.g. merocyanine and carbo merocyanine), thiazines (e.g. thionine, methylene blue, and toluidine blue), acridines (e.g. acridine orange, chloro flavin, and acriflavine), anthraquinones (e.g. anthraquinone), squaryliums (e.g. squarylium), and coumarins (e.g. 7-diethylamino-4-methylcoumarin).

Specific examples of the sensitizing dye which may be suitably used in the invention include compounds described in paragraphs [0085] to [0098] of JP-A No. 2008-214395.

(E-2) Co-Sensitizer

The ink composition of the invention may further contain, as a co-sensitizer, a known compound which may function to improve the sensitivity of the ink composition, to suppress inhibition of polymerization of the polymerizable compound due to oxygen, and the like.

Examples of such a co-sensitizer include amines, e.g., compounds disclosed in M. R. Sander et al., *Journal of Polymer Society* Vol. 10, pp. 3173 (1972), JP-B No. 44-20189 and JP-A Nos. 51-82102, 52-134692, 59-138205, 60-84305, 62-18537, and 64-33104, and *Research Disclosure* No. 33825. Specific examples include triethanolamine, ethyl p-dimethylaminobenzoate, p-formyldimethylaniline, and p-methylthiodimethylaniline.

Examples of the co-sensitizers further include thiols and sulfides, such as thiol compounds disclosed in JP-A No. 53-702, JP-B No. 55-500806, and JP-A No. 5-142772, and disulfide compounds disclosed in JP-A No. 56-75643. Specific examples include 2-mercaptobenzothiazole, 2-mercaptobenzoxazole, 2-mercaptobenzimidazole, 2-mercapto-4 (3H)-quinazoline, and β-mercaptonaphthalene.

Examples of the co-sensitizers further include amino acid compounds (e.g., N-phenylglycine), organometallic compounds disclosed in JP-B No. 48-42965 (e.g., tributyltin acetate), a hydrogen donor disclosed in JP-B No. 55-34414, sulfur compounds (e.g., trithiane) disclosed in JP-A No. 6-308727, phosphor compounds disclosed in JP-A No. 6-250387 (such as diethylphosphite), and Si—H compounds and Ge—H compounds disclosed in JP-A No. 6-191605.

(E-3) Other Additive Agents

The ink composition of the invention may further contain various additive agents according to the purpose. For example, an antioxidant and/or a polymerization inhibitor may be contained in view of improving the stability of the ink composition.

The ink composition of the invention may further contain various organic or metal complex-type discoloration inhibitors. Conductive salts such as potassium thiocyanate, lithium nitrate, ammonium thiocyanate, or dimethylamine hydrochloride may be contained for the purpose of controlling injection properties. A very small amount of organic solvent may be contained in view of improving adhesion with the recorded medium.

The ink composition of the invention may further contain various polymeric compounds in view of adjusting film properties.

The ink composition of the invention may further contain a nonionic surface active agent, a cationic surface active agent, and/or an organic fluoro compound in view of adjusting liquid properties.

(E-3-1) Surfactant

A surfactant may be added in the ink composition of the invention. Examples of the surfactant include those described in JP-A Nos. 62-173463 and 62-183457. Examples thereof include anionic surfactants such as dialkylsulfoscuccinic acid salts, alkylnaphthalenesulfonic acid salts, and fatty acid salts; nonionic surfactants such as polyoxyethylene alkylethers, polyoxyethylene alkylallylethers, acetylene glycol, and polyoxyethylene-polyoxypropylene block copolymers; and cationic surfactants such as alkylamine salts and quaternary ammonium salts. An organic fluoro compound may be used instead of the surfactant. The organic fluoro compound is preferably hydrophobic. Examples of the organic fluoro compounds include fluorochemical surfactants, oily fluorochemical compounds (e.g., fluorine oil) and solid fluorochemical compound resins (e.g., tetraethylenefluoride resin); and typical examples thereof include those described in JP-B No. 57-9053 (Columns 8 to 17) and JP-A No. 62-135826.]

The content of the surfactant in the ink composition may be adjusted so as to regulate the surface tension of the ink composition is suitable to be ejected from inkjet heads. In embodiments, the content of the surfactant may be preferably from 0% by mass to 6% by mass, more preferably from 0% by mass to 4% by mass, and further preferably from 0% by mass to 2% by mass based on the total amount of the ink composition.

(E-3-2) Polymerization Inhibitor

From the viewpoint of improving the storability, the ink composition of the invention may further contain a polymerization inhibitor. The ink composition of the invention, that is applied to inkjet recording, is preferably heated at a temperature of from 40° C. to 80° C. so as to have a low viscosity and be ejected. The polymerization inhibitor may further facilitate for suppressing thermal polymerization of components of the ink composition which may cause clogging of inkjet heads.

The content of the polymerization inhibitor is preferably 200 ppm to 20,000 ppm based on the total amount of the ink composition of the invention.

Examples of the radical polymerization inhibitor include hydroquinone, benzoquinone, p-methoxyphenol, TEMPO, TEMPOL, cupferron A1, and tris (N-nitroso-N-phenylhydroxylamine) aluminum salt.

(E-3-3) Antioxidant

The ink composition of the invention may further contain an antioxidant in view of improving stability. Examples of the antioxidant include those described in European Patent Nos. 223739, 309401, 309402, 310551, 310552, and 459-416, German Patent No. 3435443, JP-A Nos. 54-48535, 62-262047, 63-113536, 63-163351, 2-262654, 2-71262, 3-121449, 5-61166, and 5-119449, and U.S. Pat. Nos. 4,814, 262 and 4,980,275.

The content of the antioxidant in the ink composition may be adjusted according to applications. In general, the content is approximately 0.1% by mass to 8% by mass based on the total amount of the ink composition.

(E-3-4) Antifading Agent

The ink composition of the invention may further contain various organic antifading agents and metal complex antifading agents. Examples of the organic antifading agents include hydroquinones, alkoxy phenols, dialkoxy phenols, phenols, anilines, amines, indanes, chromanes, alkoxy anilines, and heterocycles. Examples of the metal complex antifading agents include nickel complexes and zinc complexes. Specific examples thereof include the compounds described in patents cited in Research Disclosure No. 17643, VII, Sections I to J, Research Disclosure No. 15162, Research Disclosure No. 18716, p. 650 left column, Research Disclosure No. 36544, p. 527, Research Disclosure No. 307105, p. 872, and Research Disclosure No. 15162, and the compounds included in the formula of typical compounds and compound examples described in JP-A No. 62-215272, pp. 127-137.

The content of the antifading agent in the ink composition may be adjusted according to applications. In embodiments, the content may be preferably 0.1% by mass to 8% by mass based on the total amount of the ink composition.

(E-3-5) Conductive Salt

The ink composition of the invention may further contain a conductive salt such as potassium thiocyanate, lithium nitrate, ammonium thiocyanate, or dimethylamine hydrochloride, for the purpose of controlling the ejection properties.

(E-3-6) Solvent

The ink composition of the invention may further contain an extremely trace amount of organic solvent for improving adhesiveness to the recording medium.

Examples of the organic solvent include ketone solvents such as acetone, methylethylketone or diethylketone; alcohol solvents such as methanol, ethanol, 2-propanol, 1-propanol, 1-butanol or tert-butanol; chlorine-based solvents such as chloroform or methylene chloride; aromatic solvents such as benzene or toluene; ester solvents such as ethyl acetate, butyl acetate or isopropyl acetate; ether solvents such as diethylether, tetrahydrofuran or dioxane; glycol ether solvents such as ethylene glycol monomethyl ether or ethylene glycol dimethyl ether.

The content of the solvent in the ink composition which may be effective is in the range that does not cause problems in solvent resistance and VOC. In embodiments, the content may be preferably in the range of 0.1% by mass to 5% by mass, more preferably 0.1% by mass to 3% by mass, based on the total amount of the ink composition.

(E-3-7) Polymer Compound

The ink composition of the invention may further contain various polymer compounds for controlling the physical properties of the film. Examples of the polymer compound include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resin, waxes, and other natural resins. These compounds may be used in combination of two or more. Among them, vinyl copolymers obtained by copolymerization of acrylic monomers are preferable. Preferable examples of the polymer compound further include copolymers containing, as copolymerization components, structural units derived from a carboxyl group-containing monomer, structural units derived from an alkyl methacrylate ester, and/or structural units derived from an alkyl acrylate ester.

Herein, the "structural unit (of a polymer) derived from a specific monomer" means a unit that has a structure which can be typically incorporated into the polymer by employing the specific monomer as that to be polymerized for forming the polymer.

(E-3-8) Basic Compound

In preferable embodiments, the ink composition of the invention may further contain a basic compound from the viewpoint of improving storage stability. Known basic compounds may be used as the basic compound in the ink composition. Preferable examples thereof include basic inorganic compounds such as inorganic salts and basic organic compounds such as amines.

(E-3-9) Other Additives

The ink composition of the invention may further contain a leveling additive, a matting agent, a wax for adjustment of film physical properties, and/or a tackifier that does not inhibit polymerization for improving adhesiveness to the recording medium formed of polyolefin, PET or the like as necessary.

Specific examples of the tackifier include the high-molecular weight adhesive polymers described in JP-A No. 2001-49200, pp. 5 to 6 (e.g., copolymers formed from an ester formed of (meth)acrylic acid and an alcohol with an alkyl group having 1 to 20 carbons, an ester formed of (meth)acrylic acid and an alicyclic alcohol having 3 to 14 carbons, and an ester formed of (meth)acrylic acid and an aromatic alcohol having 6 to 14 carbons), and a low-molecular weight adhesive resin containing a polymerizable unsaturated bond.

Physical Property of Ink Composition

In consideration of the ejection properties, the viscosity of the ink composition of the invention at 25° C. is preferably at most 40 mPa·s, more preferably from 5 mPa·s to 40 mPa·s, and further preferably from 7 mPa·s to 30 mPa·s. The viscosity of the ink composition of the invention at the temperature during ejection is preferably from 3 mPa·s to 15 mPa·s, and more preferably from 3 mPa·s to 13 mPa·s.

The ratio of amounts of components of the ink composition of the invention is preferably properly adjusted so that the viscosity falls within the above-described range. When the viscosity of the ink composition at room temperature is set as being high, penetration of the ink composition into a recording medium may be avoided even if the recording medium is porous, which allows to reduce the amount of uncured monomers. Further, bleeding of the ink droplets landed on the recording medium may be reduced, which may result in the improvement of image quality.

The surface tension of the ink composition according to the invention is preferably 20 mN/m to 35 mN/m, and more preferably 23 mN/m to 33 mN/m. When the ink composition of the invention is applied to various recording media such as polyolefin, PET, coated paper, or non-coated paper, the surface tension thereof is preferably 20 mN/m or more for preventing ink bleeding and penetration, and is preferably 35 mN/m or less for improving wettability therewith.

Inkjet Recording Method, Inkjet Recording Apparatus, and Printed Matter

The inkjet recording method, that is one aspect of the invention, includes at least: ejecting the ink composition onto a recording medium such as a support or a recording material; and curing the ejected ink composition by irradiating active radiation. This method may provide an image formed of cured ink composition on the recording medium.

The inkjet recording method of the invention uses the ink composition, that has ejection stability, may suppress the density unevenness and the line unevenness by decreasing variations in volumes of ejected ink droplets and reducing gaps between target landing positions and landed positions of the ejected ink.

In embodiments, the inkjet recording method may be performed by using the following inkjet recording apparatus.

Inkjet Recording Apparatus

The inkjet recording apparatus used in the inkjet recording method of the invention is not particularly limited, and any one of commercially available inkjet recording apparatuses may be used. That is, any commercially available inkjet recording apparatus may perform the ejection of the ink composition on an image recording medium as defined in the inkjet recording method of the invention.

The inkjet recording apparatus used in the invention has, for example, an ink-supplying system, a temperature sensor, and an active radiation source.

The ink-supplying system has, for example, a stock tank storing an inkjet composition of the invention, a supply pipe, an inkjet composition-supplying tank which supplies the ink composition t to the inkjet head, a filter, and a piezoelectric inkjet head. The piezoelectric inkjet head may be driven to eject multi-sized dots in amounts of from 1 pl to 100 pl, preferably from 8 pl to 30 pl, at a definition of from 320×320 dpi to 4,000×4,000 dpi, preferably from 400×400 dpi to 1,600×1,600 dpi, and more preferably 720×720 dpi. The "dpi" in the invention means the dot number per 2.54 cm.

A radiation curable ink preferably has a constant temperature at the time of ejection. Therefore, the inkjet recording apparatus preferably has a unit for stabilizing the temperature of the ink composition to be ejected. Piping systems and units ranging from ink tanks, which may include an intermediate ink tank when exists, to the ejection portion of nozzles of inkjet heads are subjected to the temperature stabilization. Therefore, the section from the ink supply tank to the inkjet head may be thermally insulated and heated.

The method for regulating the temperature is not limited, and preferable examples thereof include a method of providing a plurality of temperature sensors in piping areas, thereby regulating the temperature in accordance with the ink flow and the environmental temperature. The temperature sensors may be provided on the ink supply tank and in the vicinity of the nozzle of the inkjet head. The head unit to be heated is preferably thermally blocked or insulated to suppress affection of the main body of the apparatus by the temperature of an external air. In order to reduce the warm-up time of the printer, or reduce the heat energy loss, it is preferable that the head unit is thermally insulated from other sections, and the thermal capacity of the whole unit to be heated is preferably smaller.

When the ink composition for ink jet recording according to the invention is ejected, it is preferable to descrease the viscosity of the ink composition to from 3 mPa·s to 15 mPa·s (more preferably from 3 mPa·s to 13 mPa·s) by heating the ink composition to from 25° C. to 80° C. (more preferably from 25° C. to 50° C.) before ejection. Specifically, ejection may be well performed when the inkjet recording method employs, as the ink composition of the invention, one that has the viscosity of 50 mPa·s or less at 25° C. In this manner, it is possible to realize highly stable ejection.

Generally, radiation-curable ink compositions, such as the ink composition for ink jet recording according to the invention, are more viscous than aqueous inks, and the fluctuation in the viscosity of radiation-curable ink compositions caused by the fluctuation in temperature during printing is larger. The fluctuation in the viscosity of ink composition exerts significant influences on the droplet size and the droplet ejection speed, causing deterioration in image quality, and thus, it is necessary to keep the temperature of the ink composition as constant as possible during printing. It is preferable to regulate the ink composition temperature within ±5° C. from the set temperature, more preferably ±2° C. from the set temperature, and still more preferably ±1° C. from the set temperature.

The ink composition ejected onto the surface of the recording medium support is cured by irradiation with active radiation. This is because the radical polymerization initiator contained in the ink composition is decomposed by irradiation of active radiation so as to generate a radical, and the function of the radical is exhibited so as to cause and promote polymerization of radical polymerizable compounds in the ink composition. At this time, if there is a sensitizing dye present together with the radical initiator in the ink composition, the sensitizing dye in the system is activated into an excited state by absorption of the active radiation, accelerating decomposition of the initiator upon contact with the polymerization initiator, and a more sensitive curing reaction may be achieved.

Examples of the active radiation used herein include α rays, γ rays, electron beam, X rays, ultraviolet light, visible light, and infrared light. Although the peak wavelength of the active radiation varies according to the absorption properties of the sensitizing dye, but is, for example, in a range of from 200 nm to 600 nm, preferably in a range of from 300 nm to 450 nm, and more preferably in a range of from 350 nm to 420 nm.

The ink composition of the invention may have sufficient sensitivity even to low output active radiations. In embodiments, the ink composition of the invention may be suitably cured by active radiations having the illumination intensity on the exposed surface of from 10 mW/cm$^2$ to 4,000 mW/cm$^2$, and preferably from 20 mW/cm$^2$ to 2,500 mW/cm$^2$.

Mercury lamps, gas or solid state lasers and the like are widely used as active radiation sources, and mercury lamps and metal halide lamps are widely used for UV-curing inkjet. However, under the current strong needs for the elimination of the use of mercury from the viewpoint of environmental protection, it is very important industrially and environmentally to replace mercury lamps with GaN-type semiconductor UV-emitting devices. In addition, LED's (UV-LED) and LD's (UV-LD) are smaller in size, longer in lifetime, higher in efficiency, and lower in cost, and thus, attracting attention as light sources for radiation-curing inkjet printers.

As described above, a light-emitting diode (LED) or a laser diode (LD) may be used as the active radiation source. An ultraviolet LED or an ultraviolet LD may be used when an ultraviolet ray source is required. For example, a purple LED having a main emission spectrum in the wavelength range of 365 nm to 420 nm is available from Nichia Corporation. As to a light having a still shorter wavelength, U.S. Pat. No. 6,084,250 (the disclosure of which is incorporated herein by reference) discloses an LED having a main emission spectrum in the wavelength region of 300 to 370 nm. Other ultraviolet LED's are also commercially available, and capable of emitting radiations of different UV ranges. The radiation ray source used in the invention is preferably a UV-LED, and particularly preferably a UV-LED having a peak wavelength in the range of 350 to 420 nm.

The maximum illuminance of LED light on the image recording medium is preferably from 10 mW/cm$^2$, to 2000 mW/cm$^2$, more preferably from 20 mW/cm$^2$ to 1000 mW/cm$^2$, and still more preferably from 50 mW/cm$^2$ to 800 mW/cm$^2$.

The ink composition according to the invention may be irradiated with active radiation, for example, for 0.01 seconds to 120 seconds, preferably for 0.1 seconds to 90 seconds.

The irradiation condition and the basic irradiation method with the active radiation are disclosed in JP-A No. 60-132767. Specifically, the exposure is performed in a so-called shuttle process, i.e., by scanning with a head unit having an ink-ejecting device and light sources disposed at both sides of the head unit. The active radiation is irradiated a certain period (e.g., from 0.01 to 0.5 second, preferably from 0.01 to 0.3 second, and more preferably, from 0.01 to 0.15 second) after ink deposition. When the time between ink deposition and irradiation is very short, bleeding of the uncured ink deposited on the recording medium may be suppresed. Further, even when a porous recording medium is used, ink is exposed to radiation before penetrating deep into the recording medium where the radiation does not reach, whereby residual unreacted monomer may be reduced to reduce odor.

The curing of the ink may be conducted with a light source that is not driven. WO 99/54415 Pamphlet discloses an irradiation method in which the recording area is irradiated with UV rays by using an optical fiber or by using a mirror disposed on a side wall of the head unit which mirror reflects the collimated light. Such curing methods may also be applied in the ink jet recording method of the invention.

By employing such ink jet recording methods, the dot diameter of the deposited ink can be maintained constant even when various recording media that are different in surface wettability is used, thus improving the image quality.

In the method for inkjet recording of the invention, an ink set including the ink composition of the invention may be suitably used. For example, a cyan ink composition, a magenta ink composition, and a black ink composition may be combined with the ink composition of the invention of yellow color to be used as an ink set.

In order to obtain a full color image using the ink composition of the invention, it is preferable to use an ink set in which deep color ink compositions with four colors of yellow (the ink composition of the invention), cyan, magenta, and black are combined. It is further preferable to use an ink set in which a deep color ink composition group having a yellow ink (the ink composition of the invention), a cyan ink, a magenta ink, a black ink, and a white ink, is combined with an ink composition group having a light cyan ink and a light magenta ink. In this regard, the "deep color ink composition" herein means an ink composition in which the content of pigment is more than 1% by mass based on the total amount of the ink composition.

In order to obtain a color image by the method for inkjet recording of the invention, it is preferable to form images by in an order in which a color having higher lightness overcoats another color(s) having lower lightness. Specifically, when an ink set consisting of ink compositions with a yellow ink, a cyan ink, a magenta ink, and a black ink is used, it is preferably applied onto the recording medium in the order of yellow, cyan, magenta, and then black. When an ink set which includes at least seven colors of an ink composition group of a light cyan ink and a light magenta ink and a deep color ink composition group of a cyan ink, a magenta ink, a black ink, a white ink and a yellow ink is used, it is preferably applied onto the recorded medium in the order of white, light cyan, light magenta, yellow, cyan, magenta, and then black.

When color inks are applied in such order, the radiation reaches inks located at the lower portion; therefore, superior curing sensitivity, reduction in the amount of residual monomer and odor, and improvement in adhesiveness may be achieved. Although it is possible to conduct the irradiation at once after finishing ejecting all inks, the irradiation may be performed at each time that each color ink is ejected (provided on the recording medium) in view of the acceleration of curing.

The recording medium used in the invention is not particularly limited. Any recording medium known as a support or a substrate may be used. Example thereof include papers, papers laminated with plastic (e.g., polyethylene, polypropylene and polystyrene), metal plates (e.g., aluminum, zinc and copper), plastic films (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate and polyvinyl acetal), papers or plastic films laminated or deposited with above-described metal. In preferable embodiments, the recording medium may be a non-absorbable recording medium.

The printed matter of one aspect of the invention, that is a printed matter formed by recording with the inkjet recording method of the invention that suppresses unevenness in density and streak-like unevenness, is thus a high quality printed matter.

Since the ink composition to be used for image formation of the printed matter is excellent in color phase and sensitivity, the printed matter of the invention may have a high quality image excellent in coloring properties and sharpness. Therefore, it may be applied to wide fields.

EXAMPLES

Hereinafter, the invention will be described in more detail with reference to examples, but the invention is not limited to the examples. Further, "parts" and "%" are expressed in terms of mass, unless otherwise specified.

Synthesis Example 1

Synthesis of Exemplary compound (Pig.-1)

The synthetic scheme of the Exemplary compound (Pig.-1) is shown below.

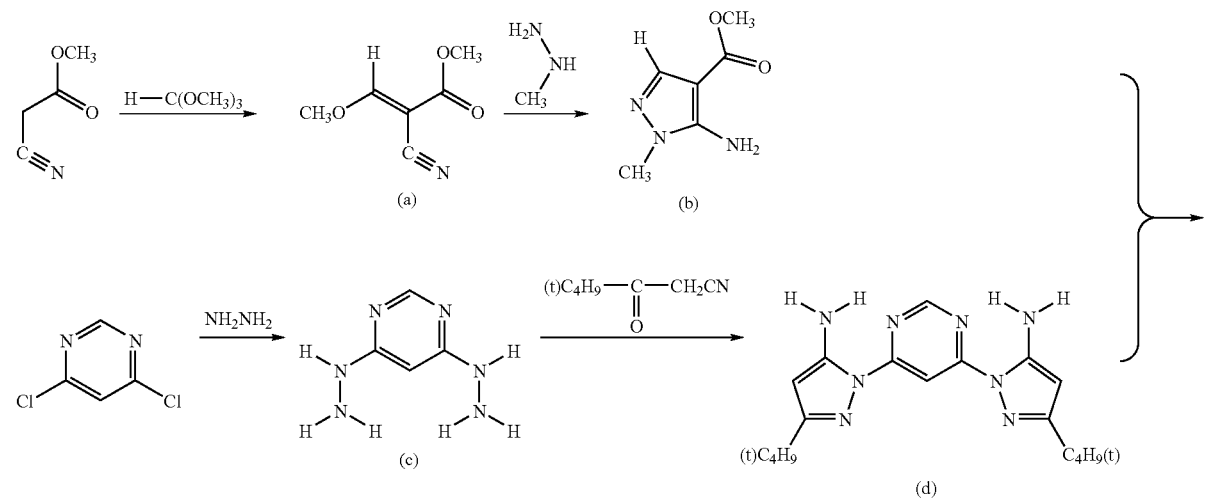

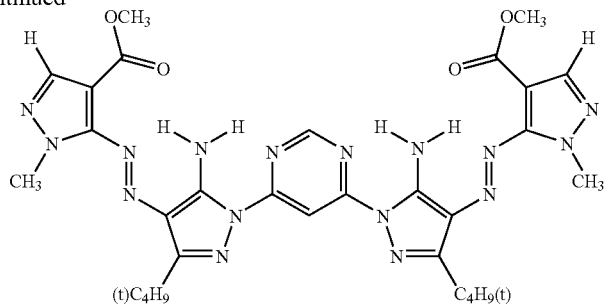

Pig.-1

(1) Synthesis of Intermediate (a)

42.4 g (0.4 mol) of trimethyl orthoformate, 20.4 g (0.2 mol) of acetic anhydride, and 0.5 g of p-toluenesulfonic acid were added to 29.7 g (0.3 mol) of methyl cyanoacetate, which was heated at 110° C. (outside temperature) and then stirred for 20 hours while a low-boiling-point component formed from the reaction system was distilled away. The reaction liquid was concentrated under reduced pressure. Thereafter, the resulting product was purified on a silica gel column, and 14.1 g of the intermediate (a) (yellow powder, yield: 30%) was obtained. The results of NMR measurement of the obtained intermediate (a) are shown below.

$^1$H-NMR (300 MHz, CDCl$_3$) 7.96 (s, 1H), 4.15 (s, 3H), 3.81 (s, 3H)

(2) Synthesis of Intermediate (b)

150 mL of i-propanol was added to 7.4 mL (141 mmol) of methylhydrazine, which was cooled to 15° C. (inside temperature). 7.0 g (49.6 mmol) of the intermediate (a) was gradually added to the mixed solution, which was then heated at 50° C. and stirred for 1 hour and 40 minutes. The reaction liquid was concentrated under reduced pressure. Thereafter, the resulting product was purified on a silica gel column, and 10.5 g of the intermediate (b) (white powder, yield: 50%) was obtained. The results of NMR measurement of the obtained intermediate (b) are shown below.

$^1$H-NMR (300 MHz, CDCl$_3$) 7.60 (s, 1H), 4.95 (brs, 2H), 3.80 (s, 3H), 3.60 (s, 3H)

(3) Synthesis of Intermediate (c)

100 mL of methanol was added to 130 mL of hydrazine monohydrate, which was cooled to 10° C. (inside temperature). 50.0 g (336 mmol) of 4,6-dichloropyrimidine was gradually added to the mixed solution (inside temperature: 20° C. or lower), which was then heated at 50° C. and stirred for 4 hours and 30 minutes. A crystal precipitated from the reaction liquid was filtered, washed with i-propanol, and dried. Thereby, 43.1 g of the intermediate (c) (white powder, yield: 92%) was obtained. The results of NMR measurement of the obtained intermediate (c) are shown below.

$^1$H-NMR (300 MHz, d$_6$-DMSO) 7.82 (s, 1H), 7.55 (s, 2H), 5.96 (s, 1H), 4.12 (s, 4H)

(4) Synthesis of Intermediate (d)

900 mL of water was added to 35.0 g (0.25 mol) of the intermediate (c) and 68.8 g (0.55 mol) of pivaloylacetonitrile, which was stirred at room temperature. 1 M hydrochloric acid aqueous solution was added dropwise into the suspension so as to give the pH of 3, which was then heated at 50° C. and stirred for 8 hours.

8 M potassium hydroxide aqueous solution was added dropwise into the reaction liquid, so as to adjust the pH to 8. Further, 1 M hydrochloric acid aqueous solution was added dropwise thereto so as to give the pH of 6. The precipitated crystal was filtered, washed with i-propanol, and dried. Thereby, 83.0 g of the intermediate (d) (white powder, yield: 94%) was obtained. The results of NMR measurement of the obtained intermediate (d) are shown below.

$^1$H-NMR (300 MHz, d$_6$-DMSO) 8.73 (s, 1H), 7.97 (s, 1H), 6.88 (s, 4H), 5.35 (s, 2H), 1.22 (s,18H)

(5) Synthesis of Exemplary Compound (Pig.-1)

18.5 mL of acetic acid was added to 4.1 mL of concentrated sulfuric acid, which was cooled on ice and stirred. 3.85 g (12.1 mmol) of 40% nitrosylsulfuric acid was added dropwise thereto. 1.71 g (11.0 mmol) of the intermediate (b) was gradually added to the mixed solution (inside temperature: 0° C. or lower), which was then stirred at 0° C. for 2 hours. 150 mg of urea was added to the reaction liquid, which was stirred at 0° C. for 15 minutes to prepare a diazo solution A.

50 mL of methanol was added to the intermediate (d), which was heated and dissolved. Then, the resulting mixed solution was cooled on ice and stirred. The diazo solution A was slowly added dropwise to the mixed solution (inside temperature: 10° C. or lower). The reaction liquid was stirred at room temperature for 2 hours. A crystal precipitated was filtered, washed with methanol. Thereby, a crude crystal of the Exemplary compound (Pig.-1) was obtained. Further, water was added to the crude crystal, which was stirred. The pH of the suspension was adjusted to 7 using a sodium hydroxide aqueous solution. 20 mL of dimethylacetamide was added thereto and stirred at 80° C. for 2 hours. A crystal precipitated was filtered and was suspended and washed with methanol. The obtained crystal was filtered and dried to give 2.0 g of the Exemplary compound (Pig.-1) (yellow powder, yield: 79%).

Exemplary compounds (Pig.-18), (Pig.-21), and (Pig.-33) were synthesized in a manner substantially similar to the synthetic scheme described above.

Each material used in Examples 1 to 3 is as follows:
Triethylene glycol divinyl ether (RAPI-CURE® DVE-3, manufactured by International Specialty Products)
Polymer dispersant, solid content: 30% (trade name: DISPERBYK-168, manufactured by BYK Chemie GmbH)
N-vinyl-ε-caprolactam (trade name: NVC, manufactured by BASF)
Dicyclopentenyloxyethylacrylate (trade name: FA-512A, manufactured by Hitachi Chemical Co., Ltd.)
2-phenoxyethylacrylate (trade name: SR339A, manufactured by SARTOMER Company, Inc.)
Caprolactone modified dipentaerythritol hexaacrylate (KAYARAD® DPCA-60, manufactured by Nippon Kayaku Co., Ltd.)
Polymerization inhibitor (FIRSTCURE® ST-1, manufactured by. Chem First Inc.)
Polymerization inhibitor (p-methoxyphenol, manufactured by Wako Pure Chemical Industries, Ltd.)
Radical polymerization initiator (LUCIRIN® TPO, manufactured by BASF)

Radical polymerization initiator (benzophenone, manufactured by Wako Pure Chemical Industries, Ltd.)

Silicone surfactant (trade name: KF-353, manufactured by Shin-Etsu Chemical Co., Ltd.)

Each of the following materials is also used in example 1 of JP-A No. 2004-2528.

C. I. Pigment Yellow 180 (trade name: YELLOW HG AF, manufactured by Clariant)

Polymer dispersant (trade name: AJISPER PB821, manufactured by Ajinomoto-Fine-Techno Co., Inc.)

Radical polymerization initiator (IRGACURE® 369, manufactured by Ciba Specialties Chemicals)

Radical polymerization initiator (DAROCURE® 1173, manufactured by Ciba Specialties Chemicals)

Preparation of Pigment Dispersion (Mill Base)

The yellow mill base having the following formulation was mixed and stirred at 3,000 rpm for 10 minutes with a mixer (trade name: L4R, manufactured by Silverson Machines, Inc.). Thereafter, the resulting product was placed into a bead mill disperser (DISPERMAT® SL, manufactured by VMA-GETZMANN GmbH), which was dispersed using zirconia beads (trade name: YTZ ball, manufactured by and Nikkato Corporation) having a diameter of 0.65 mm at a filling factor of 80% by volume at 2,500 rpm for 6 hours to produce a yellow mill base YM1.

Yellow Mill Base YM1

| | |
|---|---|
| Pigment: exemplary compound (Pig.-1) | 30 parts |
| RAPI-CURE ® DVE-3 | 26 parts |
| DISPERBYK-168 | 44 parts |

Example 1

The mixture of the following components were stirred at 2,500 rpm for 15 minutes with a mixer (trade name: L4R, manufactured by Silverson Machines, Inc.) and a yellow ink composition (ink composition of Experimental example 101) was obtained. The viscosity at 25° C. was measured using (trade name: TVE-22LT, manufactured by TOKI SANGYO CO., LTD.) and it was 18.5 mPa·s.

The surface tension at 25° C. was measured using a full automatic surface tensiometer (trade name: CBVP-Z, manufactured by Kyowa Interface Science Co., LTD. and it was 27.6 mN/m.

| | |
|---|---|
| Yellow mill base YM1 | 13.0 parts |
| N-vinyl-ε-caprolactam | 24.7 parts |

| | |
|---|---|
| FA-512A | 37.0 parts |
| SR339A | 9.3 parts |
| KAYARAD ® DPCA-60 | 1.9 parts |
| FIRSTCURE ® ST-1 | 0.3 part |
| p-methoxyphenol | 1.5 parts |
| LUCIRIN ® TPO | 9.0 parts |
| Benzophenone | 3.2 parts |
| KF-353 | 0.1 part |

In compositions of Samples 102 to 112 are prepared in the similar manner as sample 101, except that: the Exemplified compound (Pig.-1) was changed to the corresponding amount of the Exemplified compound (Pig.-18), (Pig.-21) or (Pig.-33) or C. I. Pigment Yellow 180; the polymer dispersant DISPERBYK-168 was changed to the corresponding amount of AJISPER PB821; the radical polymerization initiator LUCIRIN® TPO was changed to the corresponding amount of IRGACURE® 369; and/or the radical polymerization initiator benzophenone was changed to the corresponding amount of DAROCURE® 1173 as shown in the following Table 1.

Ejection stability (Accuracy in Ejection of Ink)

The obtained ink compositions for inkjet recording (the ink compositions 101 to 112) were respectively placed into a container made of PET, which was then sealed and left at 70° C. for 4 weeks. An inkjet recording apparatus (trade name: JETLYZER, manufactured by MIMAKI ENGINEERING CO., LTD.) equipped with an inkjet head (trade name: CA3, manufactured by TOSHIBA TEC CORPORATION) was set under conditions (ejection voltage: 22V, ejected drop: 7 drops). The ink composition was continuously ejected at 45° C. for 60 minutes and then a 10-cm line was printed. A polyvinyl chloride sheet having a thickness of 220 µm was used as the recorded medium.

The ejected ink on the recording medium was further subjected to irradiation with energy of 200 mJ/cm$^2$ with a 200-W super-high-pressure-mercury lamp to be cured. The irradiation was performed immediately about 0.5 second after the printing.

The distances between lines in a 5 cm-region from the initiation site of dotting with droplets on the obtained printed medium were measured with a dot analyzer DA-6000 (trade name, manufactured by Oji Scientific Instruments), and the standard deviation of the measured distances was calculated. From the obtained value, the accuracy in ejection direction was evaluated under the following evaluation criteria. Evaluation results are shown in Table 1.

Evaluation Criteria

AA: The standard deviation is less than 2 µm.
A: The standard deviation is 2 µm or more and less than 4 µm.
B: Practically minimum tolerable. The standard deviation is 4 µm or more and less than 6
C: The standard deviation is 6 µm or more.

TABLE 1

| Experiment No. | Pigment | Polymer dispersant | Radical polymerization initiator (1) | Radical polymerization initiator (2) | Ejection Accuracy | Note |
|---|---|---|---|---|---|---|
| Sample 101 | Exemplary compound (Pig. 1) | DISPERBYK-168 | LUCIRIN ® TPO | Benzophenone | AA | The invention |
| Sample 102 | Exemplary compound (Pig. 1) | AJISPER PB821 | LUCIRIN ® TPO | Benzophenone | A | The invention |
| Sample 103 | Exemplary compound (Pig. 18) | DISPERBYK-168 | LUCIRIN ® TPO | Benzophenone | A | The invention |
| Sample 104 | Exemplary compound (Pig. 18) | AJISPER PB821 | LUCIRIN ® TPO | Benzophenone | A | The invention |
| Sample 105 | Exemplary compound (Pig. 21) | DISPERBYK-168 | LUCIRIN ® TPO | Benzophenone | A | The invention |
| Sample 106 | Exemplary compound (Pig. 21) | AJISPER PB821 | LUCIRIN ® TPO | Benzophenone | A | The invention |

TABLE 1-continued

| Experiment No. | Pigment | Polymer dispersant | Radical polymerization initiator (1) | Radical polymerization initiator (2) | Ejection Accuracy | Note |
|---|---|---|---|---|---|---|
| Sample 107 | Exemplary compound (Pig. 33) | DISPERBYK-168 | LUCIRIN ® TPO | Benzophenone | A | The invention |
| Sample 108 | Exemplary compound (Pig. 33) | AJISPER PB821 | LUCIRIN ® TPO | Benzophenone | A | The invention |
| Sample 109 | C.I. Pigment Yellow 180 | DISPERBYK-168 | LUCIRIN ® TPO | Benzophenone | C | Comparative Example |
| Sample 110 | C.I. Pigment Yellow 180 | AJISPER PB821 | LUCIRIN ® TPO | Benzophenone | C | Comparative Example |
| Sample 111 | Exemplary compound (Pig. 1) | AJISPER PB821 | IRGACURE ® 369 | DAROCURE ® 1173 | A | The invention |
| Sample 112 | C.I. Pigment Yellow 180 | AJISPER PB821 | IRGACURE ® 369 | DAROCURE ® 1173 | C | Comparative Example |

From Samples 101 to 108 and 111, it is found that excellent ink ejection accuracy may be obtained even after storage at high temperatures when the Exemplary compound (Pig.-1), (Pig.-18), (Pig.-21), or (Pig.-33) is used as the pigment.

From Samples 109, 110 and 112, it is found that the ink ejection accuracy may be deteriorated when C. I. Pigment Yellow 74 is used as the pigment in place of the Exemplary compounds.

Example 2

The ink composition of the example 1 of JP-A No. 2004-2528, which contains C. I. Pigment Yellow 180 as a pigment, was prepared as a comparative example, and subjected to the evaluation in the similar manner as the samples of Example 1. It turned out that the thus-prepared comparative example revealed inferior ink ejection accuracy of grade C.

Ink compositions were further prepared in the similar manner as that of the example 1 of JP-A No. 2004-2528 except that C. I. Pigment Yellow 180 was changed to the Exemplary compound (Pig.-1), (Pig.-18), (Pig.-21), or (Pig.-33) in the respective ink compositions. It turned out that the thus-prepared ink compositions of the invention revealed excellent ink ejection accuracy of grade A.

Example 3

The ink compositions for inkjet recording of samples of Examples 1 and 2 were prepared and subjected to the evaluation in the similar manner as the samples of Examples 1 to 2 except that the inks were placed into a container made of high density polyethylene, which was then sealed and left at room temperature for 3 months in place of being placed into the PET container to be sealed and left at 70° C. for 4 weeks. It turned out that the thus-prepared samples using the radiation-curable ink composition for inkjet recording of the invention (namely, samples containing one of the Exemplary compounds (Pig.-1), (Pig.-18), (Pig.-21), and (Pig.-33)) revealed excellent ink ejection accuracy of grade A, that is similar to those of the samples of the invention shown in Examples 1 to 2.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. A radiation-curable ink composition for inkjet recording, the ink composition comprising:
    an azo compound represented by Formula (1), a tautomer of the azo compound, a salt of the azo compound, a salt of the tautomer, a hydrate of the azo compound, a hydrate of the tautomer, or any combination thereof;
    a polymer dispersant;
    a radical polymerizable compound; and
    a radical polymerization initiator:

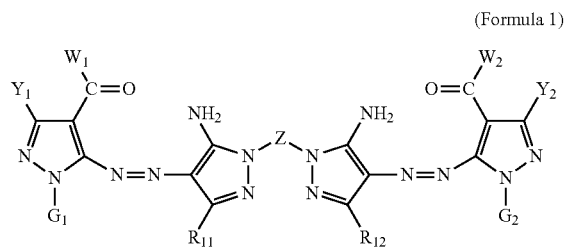

(Formula 1)

wherein, in Formula (I):
Z represents a divalent group having a 5- to 8-membered nitrogen-containing heterocycle;
$G_1$ and $G_2$ each independently represent a hydrogen atom, an alkyl group, a cycloalkyl group, an aralkyl group, an alkenyl group, an alkynyl group, an aryl group or a heterocyclic group;
$W_1$ and $W_2$ each independently represent an alkoxy group, an amino group, an alkyl group, or an aryl group,
$Y_1$ and $Y_2$ each independently represent a hydrogen atom, a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, or a silyl group, and $R_{11}$ and $R_{12}$ each independently represents a hydrogen atom, a straight chain or branched alkyl group having from 1 to 12 carbon atoms; a straight chain or branched aralkyl group having from 7 to 18 carbon atoms; a straight chain or branched alkenyl group having from 2 to 12 carbon atoms; a straight chain or branched alkynyl group having from 2 to 12 carbon atoms; a straight chain or branched cycloalkyl group having from 3 to 12 carbon atoms; a straight chain or branched cycloalkenyl group having from 3 to 12 carbon atoms; a halogen atom; an aryl group; a heterocyclic group; a cyano group; a hydroxy group; a nitro group; a carboxy group; an amino group; an alkyloxy group; and aryloxy group; an acylamino group; an alkylamino group; an arylamino group; a ureido group; a sulfamoylamino group; an alkylthio group; an arylthio group; an alkyloxycarbonylamino group; an alkylsulfonylamino group; an arylsulfonylamino group; a carbamoyl group; a sulfamoyl group; a sulfonyl group; an alkyloxycarbonyl group; a heterocyclic oxy group; an azo group; an acyloxy group; a carbamoyloxy group; a silyloxy group; an aryloxycarbonylamino group; an imido group; a heterocyclic thio group; a sulfinyl group; a phosphonyl group; an aryloxycarbonyl group; an acyl group; or an ionic hydrophilic group.

2. The radiation-curable ink composition for inkjet recording of claim 1, wherein, in Formula (1), $W_1$ and $W_2$ each independently represent an alkoxy group having 3 or fewer carbon atoms, an amino group, or an alkylamino group having 3 or fewer carbon atoms.

3. The radiation-curable ink composition for inkjet recording of claim 1, wherein, in Formula (1), $G_1$ and $G_2$ each independently represent an alkyl group having 3 or fewer carbon atoms.

4. The radiation-curable ink composition for inkjet recording of claim 1, wherein, in Formula (1), Z represents a divalent group having a 6-membered nitrogen-containing heterocycle.

5. An inkjet recording method comprising:
ejecting the ink composition of claim 1 onto a recording medium; and
curing the ejected ink composition by irradiating the ejected ink composition with active radiation.

6. Printed matter formed by the inkjet recording method of claim 5.

7. Printed matter comprising, on a recording medium, an image formed from the radiation-curable ink composition for inkjet recording of claim 1 which is ejected onto the recording medium and cured by being irradiated with active radiation.

8. The radiation-curable ink composition for inkjet recording of claim 1, wherein, in Formula (1), Z represents one selected from the group consisting of a divalent group having a 5-membered nitrogen-containing heterocycle, a divalent group having a 7-membered nitrogen-containing heterocycle, a divalent group having a 8-membered nitrogen-containing heterocycle, a divalent group having a pyridine ring, and a group represented by the following Formula:

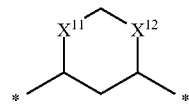

wherein in the Formula, $X^{11}$ and $X^{12}$ each independently represent a heteroatom, and an asterisk (*) represents a position at which the nitrogen atom adjacent to Z is linked.

9. The radiation-curable ink composition for inkjet recording of claim 8, wherein $X^{11}$ and $X^{12}$ respectively represent a nitrogen atom.

* * * * *